US012602418B2

(12) United States Patent
Bhat et al.

(10) Patent No.: US 12,602,418 B2
(45) Date of Patent: *Apr. 14, 2026

(54) INTELLIGENT QUERY DECOMPOSITION, SPECIALIZED MODEL ROUTING, AND HIERARCHICAL AGGREGATION WITH CONFLICT RESOLUTION

(71) Applicant: Citibank, N.A., New York, NY (US)

(72) Inventors: Ganesh Prasad Bhat, New Jersey, NJ (US); James Myers, New York, NY (US); Zheyu Wang, Shanghai (CN); Haolin Jin, Shanghai (CN); Sourabh Deb, Tampa, FL (US); Jason Ryan Engelbrecht, London (GB); Payal Jain, London (GB); Tariq Husayn Maonah, London (GB); Mariusz Saternus, Cracow (PL); Daniel Lewandowski, Cracow (PL); Biraj Krushna Rath, London (GB); Stuart Murray, London (GB); Philip Davies, London (GB); Julisia Jackson, Irving, TX (US); Chamindra Desilva, London (GB); Shardul Malviya, London (GB); Wayne Liao, London (GB); Deepak Jain, London (GB); Samantha Cory, London (GB); Vishal Mysore, Mississauga (CA); Ramkumar Ayyadurai, Jersey City, NJ (US)

(73) Assignee: Citibank, N.A.

( * ) Notice: Subject to any disclaimer, the term of this patent is extended or adjusted under 35 U.S.C. 154(b) by 0 days.

This patent is subject to a terminal disclaimer.

(21) Appl. No.: 19/309,601

(22) Filed: Aug. 25, 2025

(65) Prior Publication Data

US 2025/0378099 A1      Dec. 11, 2025

Related U.S. Application Data

(63) Continuation-in-part of application No. 19/301,756, filed on Aug. 15, 2025, which is a
(Continued)

(51) Int. Cl.
*G06F 16/338* (2019.01)
*G06F 16/383* (2019.01)

(52) U.S. Cl.
CPC .......... *G06F 16/338* (2019.01); *G06F 16/383* (2019.01)

(58) Field of Classification Search
CPC ...................................................... G06F 16/338
See application file for complete search history.

(56) References Cited

U.S. PATENT DOCUMENTS 5,423,041 A      6/1995  Burke et al.
5,586,218 A     12/1996  Allen
(Continued)

FOREIGN PATENT DOCUMENTS

CN          106502890 A      3/2017
WO        2021160499 A1      8/2021
(Continued)

OTHER PUBLICATIONS

AI Risk Management Framework NIST, retrieved on Jun. 17, 2024, https://www.nist.gov/itl/ai-risk-management-framework.
(Continued)

*Primary Examiner* — Van H Oberly
(74) *Attorney, Agent, or Firm* — Perkins Coie LLP

(57) ABSTRACT

Systems, methods, and devices that relate to intelligent query decomposition and parallel routing for specialized model processing are disclosed. In one example aspect, the system receives a query from a user comprising a request relating to a particular domain. The system determines,
(Continued)

using a decomposition model, a set of sub-queries based on semantic boundaries, syntactics, tasks, relationships, and rules relating to particular domains. The system inputs the set of sub-queries into a routing model to determine a set of specialized models. For each sub-query, the system routes the sub-query to a respective specialized model, generates an output, and assigns a confidence score. The system detects conflicts among outputs using a conflict detection model configured to identify discrepancies. The system generates an aggregated output by combining outputs according to a weighted aggregation algorithm prioritizing higher confidence scores and conflict resolution rules, then displays the aggregated output.

17 Claims, 14 Drawing Sheets

Related U.S. Application Data continuation-in-part of application No. 18/812,913, filed on Aug. 22, 2024, which is a continuation-in-part of application No. 18/661,532, filed on May 10, 2024, now Pat. No. 12,111,747, which is a continuation-in-part of application No. 18/661,519, filed on May 10, 2024, now Pat. No. 12,106,205, which is a continuation-in-part of application No. 18/633,293, filed on Apr. 11, 2024, now Pat. No. 12,147,513, application No. 19/309,601, filed on Aug. 25, 2025 is a continuation-in-part of application No. 19/227,442, filed on Jun. 3, 2025, which is a continuation of application No. 19/061,848, filed on Feb. 24, 2025, now Pat. No. 12,339,886, which is a continuation-in-part of application No. 18/983,342, filed on Dec. 17, 2024, now Pat. No. 12,450,494, which is a continuation-in-part of application No. 18/653,858, filed on May 2, 2024, now Pat. No. 12,198,030, which is a continuation-in-part of application No. 18/637,362, filed on Apr. 16, 2024, now Pat. No. 12,111,754, said application No. 19/061,848 is a continuation-in-part of application No. 18/661,532, filed on May 10, 2024, now Pat. No. 12,111,747, which is a continuation-in-part of application No. 18/661,519, filed on May 10, 2024, now Pat. No. 12,106,205, and a continuation-in-part of application No. 18/633,293, filed on Apr. 11, 2024, now Pat. No. 12,147,513.

(56) References Cited

U.S. PATENT DOCUMENTS

| | | | |
|---|---|---|---|
| 5,671,361 | A | 9/1997 | Brown et al. |
| 6,169,981 | B1 | 1/2001 | Werbos |
| 6,208,720 | B1 | 3/2001 | Curtis et al. |
| 6,473,748 | B1 | 10/2002 | Archer |
| 6,546,545 | B1 | 4/2003 | Honarvar et al. |
| 6,587,846 | B1 | 7/2003 | Lamuth |
| 7,313,552 | B2 | 12/2007 | Lorenz et al. |
| 7,669,133 | B2 | 2/2010 | Chikirivao et al. |
| 7,822,621 | B1 | 10/2010 | Chappel |
| 7,984,513 | B1 | 7/2011 | Kyne et al. |
| 8,347,147 | B2 | 1/2013 | Adiyapatham et al. |
| 8,380,817 | B2 | 2/2013 | Okada |
| 8,387,020 | B1 | 2/2013 | Maclachlan et al. |
| 8,572,552 | B2 | 10/2013 | Kennaley |
| 8,656,343 | B2 | 2/2014 | Fox et al. |
| 8,930,298 | B2 | 1/2015 | Demuth et al. |
| 9,020,872 | B2 | 4/2015 | Junker |
| 9,215,212 | B2 | 12/2015 | Reddy et al. |
| 9,251,466 | B2 | 2/2016 | Rajesh |

| | | | |
|---|---|---|---|
| 9,842,045 | B2 | 12/2017 | Heorhiadi et al. |
| 9,858,828 | B1 | 1/2018 | Fuka |
| 10,157,355 | B2 | 12/2018 | Johnson et al. |
| 10,276,170 | B2 | 4/2019 | Gruber et al. |
| 10,324,827 | B2 | 6/2019 | Narayanan et al. |
| 10,438,212 | B1 | 10/2019 | Jilani et al. |
| 10,554,738 | B1 | 2/2020 | Ren |
| 10,607,141 | B2 | 3/2020 | Jerram et al. |
| 10,620,988 | B2 | 4/2020 | Lauderdale et al. |
| 10,755,103 | B2 | 8/2020 | Chang et al. |
| 10,764,150 | B1 | 9/2020 | Hermoni et al. |
| 10,943,067 | B1 | 3/2021 | Brown et al. |
| 10,949,337 | B1 | 3/2021 | Yalla et al. |
| 10,951,485 | B1 | 3/2021 | Hermoni et al. |
| 11,042,647 | B1 | 6/2021 | Joyce et al. |
| 11,074,107 | B1 | 7/2021 | Nandakumar |
| 11,106,801 | B1 | 8/2021 | Levine et al. |
| 11,133,942 | B1 | 9/2021 | Griffin |
| 11,153,177 | B1 | 10/2021 | Hermoni et al. |
| 11,164,078 | B2 | 11/2021 | Jin et al. |
| 11,227,047 | B1 | 1/2022 | Vashisht et al. |
| 11,227,187 | B1 | 1/2022 | Weinberger |
| 11,271,822 | B1 | 3/2022 | Hermoni et al. |
| 11,315,196 | B1 | 4/2022 | Narayan et al. |
| 11,328,068 | B1 | 5/2022 | Niedzwiedz et al. |
| 11,410,136 | B2 | 8/2022 | Cook et al. |
| 11,436,777 | B1 | 9/2022 | Karli et al. |
| 11,449,798 | B2 | 9/2022 | Olgiati et al. |
| 11,470,106 | B1 | 10/2022 | Lin et al. |
| 11,481,553 | B1 | 10/2022 | Durvasula et al. |
| 11,503,075 | B1 | 11/2022 | Sirianni et al. |
| 11,516,158 | B1 | 11/2022 | Luzhnica et al. |
| 11,516,222 | B1 | 11/2022 | Srinivasan et al. |
| 11,531,943 | B1 | 12/2022 | Kumar |
| 11,562,078 | B2 | 1/2023 | Sabourin et al. |
| 11,573,848 | B2 | 2/2023 | Linck et al. |
| 11,586,436 | B1 | 2/2023 | Jennings |
| 11,593,390 | B2 | 2/2023 | Sundel |
| 11,636,027 | B2 | 4/2023 | Sloane |
| 11,652,839 | B1 | 5/2023 | Aloisio et al. |
| 11,656,852 | B2 | 5/2023 | Mazurskiy |
| 11,663,409 | B2 | 5/2023 | Terry et al. |
| 11,663,662 | B2 | 5/2023 | Chen et al. |
| 11,676,685 | B2 | 6/2023 | Jaganathan et al. |
| 11,681,610 | B2 | 6/2023 | Chang et al. |
| 11,681,811 | B1 | 6/2023 | Dixit |
| 11,683,333 | B1 | 6/2023 | Dominessy et al. |
| 11,706,241 | B1 | 7/2023 | Cross et al. |
| 11,709,757 | B1 | 7/2023 | Kurian et al. |
| 11,720,686 | B1 | 8/2023 | Cross et al. |
| 11,734,418 | B1 | 8/2023 | Epstein |
| 11,734,591 | B2 | 8/2023 | Turner et al. |
| 11,741,226 | B2 | 8/2023 | Dixit |
| 11,750,717 | B2 | 9/2023 | Walsh et al. |
| 11,765,100 | B1 | 9/2023 | Sloane et al. |
| 11,803,792 | B2 | 10/2023 | Makhija et al. |
| 11,811,730 | B1 | 11/2023 | Kandasamy et al. |
| 11,823,108 | B1 | 11/2023 | Bradbury et al. |
| 11,842,408 | B1 | 12/2023 | Martinez et al. |
| 11,853,735 | B1 | 12/2023 | Choudhury et al. |
| 11,874,934 | B1 | 1/2024 | Rao et al. |
| 11,875,123 | B1 | 1/2024 | Ben David et al. |
| 11,875,130 | B1 | 1/2024 | Bosnjakovic et al. |
| 11,915,152 | B2 | 2/2024 | Baker |
| 11,924,027 | B1 | 3/2024 | Mysore et al. |
| 11,947,435 | B2 | 4/2024 | Boulineau et al. |
| 11,960,386 | B2 | 4/2024 | Indani et al. |
| 11,960,515 | B1 | 4/2024 | Pallakonda et al. |
| 11,983,806 | B1 | 5/2024 | Ramesh et al. |
| 11,990,139 | B1 | 5/2024 | Sandrew |
| 11,995,412 | B1 | 5/2024 | Mishra |
| 12,001,463 | B1 | 6/2024 | Pallakonda et al. |
| 12,007,963 | B1 | 6/2024 | Rajagopalan et al. |
| 12,026,599 | B1 | 7/2024 | Lewis et al. |
| 12,028,368 | B1 | 7/2024 | Cohen et al. |
| 12,088,611 | B1 | 9/2024 | Lin et al. |
| 12,094,010 | B1 | 9/2024 | Hampapur et al. |
| 12,106,205 | B1 | 10/2024 | Jain et al. |
| 12,111,747 | B1 | 10/2024 | Jain et al. |

(56) References Cited

U.S. PATENT DOCUMENTS

| | | |
|---|---|---|
| 12,111,754 B1 | 10/2024 | Mysore et al. |
| 12,131,819 B1 | 10/2024 | Murray et al. |
| 12,135,949 B1 | 11/2024 | Cameron et al. |
| 12,147,513 B1 | 11/2024 | Jain et al. |
| 12,149,553 B1 | 11/2024 | Fly et al. |
| 12,149,558 B1 | 11/2024 | Brown et al. |
| 12,155,781 B1 | 11/2024 | Helfgott et al. |
| 12,182,258 B2 | 12/2024 | Stokes et al. |
| 12,198,030 B1 | 1/2025 | Mysore et al. |
| 2003/0007178 A1 | 1/2003 | Jeyachandran et al. |
| 2004/0098454 A1 | 5/2004 | Trapp et al. |
| 2005/0166094 A1 | 7/2005 | Blackwell et al. |
| 2005/0204348 A1 | 9/2005 | Horning et al. |
| 2006/0095918 A1 | 5/2006 | Hirose |
| 2007/0067848 A1 | 3/2007 | Gustave et al. |
| 2010/0275263 A1 | 10/2010 | Bennett et al. |
| 2010/0313189 A1 | 12/2010 | Beretta et al. |
| 2012/0161940 A1 | 6/2012 | Taylor |
| 2014/0137257 A1 | 5/2014 | Martinez et al. |
| 2014/0258998 A1 | 9/2014 | Adl-tabatabai et al. |
| 2016/0103996 A1 | 4/2016 | Salajegheh et al. |
| 2017/0061132 A1 | 3/2017 | Hovor et al. |
| 2017/0262164 A1 | 9/2017 | Jain et al. |
| 2017/0279826 A1 | 9/2017 | Mohanty et al. |
| 2017/0295197 A1 | 10/2017 | Parimi et al. |
| 2018/0020021 A1 | 1/2018 | Gilmore et al. |
| 2018/0089252 A1 | 3/2018 | Long et al. |
| 2018/0095866 A1 | 4/2018 | Narayanan et al. |
| 2018/0239903 A1 | 8/2018 | Bodin et al. |
| 2018/0343114 A1 | 11/2018 | Ben-ari |
| 2019/0079854 A1 | 3/2019 | Lassance Oliveira E Silva et al. |
| 2019/0188706 A1 | 6/2019 | Mccurtis |
| 2019/0236661 A1 | 8/2019 | Hogg et al. |
| 2019/0286816 A1 | 9/2019 | Fu |
| 2020/0012493 A1 | 1/2020 | Sagy |
| 2020/0043164 A1 | 2/2020 | Fuchs et al. |
| 2020/0074470 A1 | 3/2020 | Deshpande et al. |
| 2020/0133711 A1 | 4/2020 | Webster et al. |
| 2020/0153855 A1 | 5/2020 | Kirti et al. |
| 2020/0219009 A1 | 7/2020 | Dao et al. |
| 2020/0233979 A1 | 7/2020 | Tahmasebi Maraghoosh et al. |
| 2020/0259852 A1 | 8/2020 | Wolff et al. |
| 2020/0309767 A1 | 10/2020 | Loo et al. |
| 2020/0314191 A1 | 10/2020 | Madhavan et al. |
| 2020/0334326 A1 | 10/2020 | Zhang et al. |
| 2020/0349054 A1 | 11/2020 | Dai et al. |
| 2020/0380118 A1 | 12/2020 | Miller et al. |
| 2020/0387608 A1 | 12/2020 | Miller et al. |
| 2021/0012486 A1 | 1/2021 | Huang et al. |
| 2021/0049288 A1 | 2/2021 | Li |
| 2021/0089941 A1 | 3/2021 | Chen et al. |
| 2021/0097433 A1 | 4/2021 | Olgiati et al. |
| 2021/0133182 A1 | 5/2021 | Anderson et al. |
| 2021/0173935 A1 | 6/2021 | Ramasamy et al. |
| 2021/0185094 A1 | 6/2021 | Waplington et al. |
| 2021/0211431 A1 | 7/2021 | Albero et al. |
| 2021/0256125 A1 | 8/2021 | Miller et al. |
| 2021/0264547 A1 | 8/2021 | Li |
| 2021/0273957 A1 | 9/2021 | Boyer et al. |
| 2021/0390465 A1 | 12/2021 | Werder et al. |
| 2022/0050928 A1 | 2/2022 | Shukla et al. |
| 2022/0114251 A1 | 4/2022 | Guim Bernat et al. |
| 2022/0114399 A1 | 4/2022 | Castiglione et al. |
| 2022/0147636 A1 | 5/2022 | Mahuli et al. |
| 2022/0179906 A1 | 6/2022 | Desai et al. |
| 2022/0198304 A1 | 6/2022 | Szczepanik et al. |
| 2022/0263843 A1 | 8/2022 | Aslam et al. |
| 2022/0263855 A1 | 8/2022 | Engelberg et al. |
| 2022/0263860 A1 | 8/2022 | Crabtree et al. |
| 2022/0278889 A1 | 9/2022 | Malleshaiah et al. |
| 2022/0286438 A1 | 9/2022 | Burke et al. |
| 2022/0286474 A1 | 9/2022 | Kuppa et al. |
| 2022/0294789 A1 | 9/2022 | Tikhomirov et al. |
| 2022/0294810 A1 | 9/2022 | Tyagi et al. |
| 2022/0303300 A1 | 9/2022 | Egan |
| 2022/0303302 A1 | 9/2022 | Hwang et al. |
| 2022/0303352 A1 | 9/2022 | Herzog et al. |
| 2022/0311681 A1 | 9/2022 | Palladino et al. |
| 2022/0318654 A1 | 10/2022 | Lin et al. |
| 2022/0327620 A1 | 10/2022 | Ndoutoumou |
| 2022/0334818 A1 | 10/2022 | Mcfarland |
| 2022/0342846 A1 | 10/2022 | Kunchakarra et al. |
| 2022/0345457 A1 | 10/2022 | Jeffords et al. |
| 2022/0358023 A1 | 11/2022 | Moser et al. |
| 2022/0366140 A1 | 11/2022 | Saito et al. |
| 2022/0368728 A1 | 11/2022 | Murray et al. |
| 2022/0377093 A1 | 11/2022 | Crabtree et al. |
| 2022/0398149 A1 | 12/2022 | Mcfarland et al. |
| 2022/0400135 A1 | 12/2022 | Gamra |
| 2022/0414213 A1 | 12/2022 | Dixit |
| 2022/0414536 A1 | 12/2022 | M L et al. |
| 2022/0417274 A1 | 12/2022 | Madanahalli et al. |
| 2023/0007039 A1 | 1/2023 | Waplington |
| 2023/0009999 A1 | 1/2023 | Higuchi et al. |
| 2023/0019072 A1 | 1/2023 | Okunlola |
| 2023/0028339 A1 | 1/2023 | Sloane |
| 2023/0032686 A1 | 2/2023 | Williams et al. |
| 2023/0033317 A1 | 2/2023 | Lin et al. |
| 2023/0035321 A1 | 2/2023 | Vijayaraghavan |
| 2023/0039855 A1 | 2/2023 | Greene |
| 2023/0044102 A1 | 2/2023 | Anderson et al. |
| 2023/0052608 A1 | 2/2023 | Wattiau et al. |
| 2023/0067128 A1 | 3/2023 | Engelberg et al. |
| 2023/0071264 A1 | 3/2023 | Hakala et al. |
| 2023/0076372 A1 | 3/2023 | Engelberg et al. |
| 2023/0076795 A1 | 3/2023 | Indani et al. |
| 2023/0077527 A1 | 3/2023 | Sarkar |
| 2023/0109021 A1 | 4/2023 | Curtin et al. |
| 2023/0113621 A1 | 4/2023 | Griffin et al. |
| 2023/0114719 A1 | 4/2023 | Thomas et al. |
| 2023/0117962 A1 | 4/2023 | Kaimal et al. |
| 2023/0118388 A1 | 4/2023 | Crabtree et al. |
| 2023/0123314 A1 | 4/2023 | Crabtree et al. |
| 2023/0132703 A1 | 5/2023 | Marsenic et al. |
| 2023/0135660 A1 | 5/2023 | Chapman et al. |
| 2023/0148116 A1 | 5/2023 | Stokes et al. |
| 2023/0164158 A1 | 5/2023 | Fellows et al. |
| 2023/0169397 A1 | 6/2023 | Smith et al. |
| 2023/0171282 A1 | 6/2023 | Bollinger |
| 2023/0177441 A1 | 6/2023 | Durvasula et al. |
| 2023/0177613 A1 | 6/2023 | Crabtree et al. |
| 2023/0186175 A1 | 6/2023 | Usatov et al. |
| 2023/0205888 A1 | 6/2023 | Tyagi et al. |
| 2023/0205891 A1 | 6/2023 | Yellapragada et al. |
| 2023/0208869 A1 | 6/2023 | Bisht et al. |
| 2023/0208870 A1 | 6/2023 | Yellapragada et al. |
| 2023/0208871 A1 | 6/2023 | Yellapragada et al. |
| 2023/0229542 A1 | 7/2023 | Watkins et al. |
| 2023/0252393 A1 | 8/2023 | Orzechowski et al. |
| 2023/0259860 A1 | 8/2023 | Sarkar |
| 2023/0269272 A1 | 8/2023 | Dambrot et al. |
| 2023/0274003 A1 | 8/2023 | Liu et al. |
| 2023/0359789 A1 | 11/2023 | Andre et al. |
| 2023/0362200 A1 | 11/2023 | Crabtree et al. |
| 2023/0396641 A1 | 12/2023 | Hebbagodi et al. |
| 2023/0412635 A1 | 12/2023 | Binyamini et al. |
| 2024/0012734 A1 | 1/2024 | Lee et al. |
| 2024/0020538 A1 | 1/2024 | Socher et al. |
| 2024/0054233 A1 | 2/2024 | Ohayon et al. |
| 2024/0054249 A1 | 2/2024 | Loubet Moundi et al. |
| 2024/0095077 A1 | 3/2024 | Singh et al. |
| 2024/0129345 A1 | 4/2024 | Kassam et al. |
| 2024/0144082 A1 | 5/2024 | Tarapov et al. |
| 2024/0202442 A1 | 6/2024 | Saito et al. |
| 2024/0256678 A1 | 8/2024 | Thompson |
| 2024/0346283 A1 | 10/2024 | Ayachitula et al. |
| 2024/0364749 A1 | 10/2024 | Crabtree et al. |
| 2024/0370476 A1 | 11/2024 | Madisetti et al. |
| 2024/0403428 A1 | 12/2024 | Lal et al. |
| 2024/0403437 A1 | 12/2024 | Szigeti et al. |
| 2024/0403445 A1 | 12/2024 | Straub et al. |
| 2024/0406145 A1 | 12/2024 | Crabtree et al. |

(56) References Cited

U.S. PATENT DOCUMENTS

| | | |
|---|---|---|
| 2024/0411896 A1 | 12/2024 | Myers et al. |
| 2024/0414211 A1 | 12/2024 | Boyer et al. |
| 2024/0427994 A1* | 12/2024 | Odland .................... G06N 3/08 |

FOREIGN PATENT DOCUMENTS

| | | |
|---|---|---|
| WO | 2022125803 A1 | 6/2022 |
| WO | 2024020416 A1 | 1/2024 |

OTHER PUBLICATIONS

Empower Your Team with a Compliance Co-Pilot, Sedric, retrieved on Sep. 25, 2024. https://www.sedric.ai/.

Independent analysis of AI language models and API providers. Artificial Analysis, retrieved on Jun. 13, 2024, https://artificialanalysis.ai/, 11 pages.

What is AI Verify?, AI Verify Foundation, Jun. 11, 2024, 3 pages, https://aiverifyfoundation.sg/.

Agarwal et al., How generative AI can help banks manage risk and compliance, McKinsey & Company, Mar. 2024; Total Pages: 8 (Year: 2024).

Aka et al., Measuring Model Biases in the Absence of Ground Truth, AIES '21, May 19-21, 2021, Virtual Event, USA.; pp. 327-335 (Year: 2021).

Behravesh et al, "Rule Modeling Engine for Optimizing Complex Event Processing Patterns", IEEE, pp. 128-135 (Year: 2009).

Brown, D., et al., "The Great AI Challenge: We Test Five Top Bots on Useful, Everyday Skills," The Wall Street Journal, published May 25, 2024.

Burnashev et al, "Design and Implementation of Integrated Development Environment for Building Rule-Based Expert Systems", IEEE, pp. 1-4 (Year: 2020).

Cranium, Adopt & Accelerate AI Safely, retrieved on Nov. 7, 2024, from https://cranium.ai/.

Cuadrado et al, "An Autonomous Engine for Services Configuration and Deployment", IEEE, pp. 520-536 (Year: 2012).

Dong, Y., et al., "Building Guardrails for Large Language Models," https://ar5iv.labs.arxiv.org/html/2402.01822v1, published May 29, 2024, 20 pages.

Fickas, "Design Issues in a Rule-Based System", ACM, pp. 208-215 (Year: 1985).

Futurism, "Sam Altman Admits That OpenAI Doesn't Actually Understand How Its AI Works", Jun. 11, 2024, 4 pages, https://futurism.com/sam-altman-admits-openai-understand-ai.

Ge et al, "Automatic Generation of Rule-based Software Configuration Management Systems", ACM, pp. 659 (Year: 2005).

Geiger, et al., "TadGAN: Time series anomaly detection using generative adversarial networks", 2020 IEEE International Conference on Big Data, 2020 (Year: 2020).

Generative machine learning models; IPCCOM000272835D, Aug. 17, 2023. (Year: 2023).

Genesis et al "CI Ref: A Tool for Visualizing the Historical Data of Software Refactorings in Java Projects", ACM, pp. 174-179 (Year: 2023).

Guana et al, "Backward Propagation of Code Refinements on Transformational Code Generation Environments", IEEE, pp. 55-60 ( Year: 2013).

Guldimann, P., et al. "COMPL-AI Framework: A Technical Interpretation and LLM Benchmarking Suite for the EU Artificial Intelligence Act," arXiv:2410.07959v1 [cs.CL] Oct. 10, 2024, 38 pages.

Halvonik et al, "Large Language Models and Rule-Based Approaches in Domain-Specific Communication", IEEE, pp. 107046-107058 (Year: 2024).

Hu, Q., J., et al., "ROUTERBENCH: A Benchmark for Multi-LLM Routing System," arXiv:2403.12031v2 [cs.LG] Mar. 28, 2024, 16 pages.

Huang et al, "AI Coding: Learning to Construct Error Correction Codes", IEEE, pp. 26-39 (Year: 2020).

International Search Report and Written Opinion received in Application No. PCT/US24/47571, dated Dec. 9, 2024, 10 pages.

International Search Report and Written Opinion received in Application No. PCT/US25/24406, dated Jul. 18, 2025, 10 pages.

International Search Report and Written Opinion Received in Application No. PCT/US25/24939, dated Jul. 30, 2025, 12 pages.

International Search Report and Written Opinion received in Application No. PCT/US23/85942, dated Feb. 15, 2024, 6 pages.

Jiang et al, "Self-Planning Code Generation with Large Language Models", ACM, pp. 1-30 (Year: 2024).

Kibria et al., "Big Data Analytics, Machine Learning, and Artificial Intelligence in Next-Generation Wireless Networks", IEEE, pp. 32328-32338 (Year: 2018).

Kojima, Takeshi, et al. "Large Language Models are Zero-Shot Reasoners," 36th Conference on Neural Information Processing Systems (NeurIPS 2022), arXiv:2205.11916 [cs.CL], Jan. 29, 2023, 42 pages.

Kumar et al, "A Rule-based Recommendation System for Selection of Software Development Life Cycle Models", ACM, pp. 1-6 (Year: 2013).

Lai et al., Towards a Science of Human-AI Decision Making: A Survey of Empirical Studies, arXiv:2112.11471v1 [cs.AI] Dec. 21, 2021; Total Pages: 36 (Year: 2021).

Langley et al, "Applications of Machine Learning and Rule Induction", ACM, pp. 54-64 (Year: 1995).

Idrizi "Exploring the Role of Explainable Artificial Intelligence(XAI) in Adaptive learning systems", ACM, pp. 100-105 (Year: 2024).

Li, et al., "Anomaly detection with generative adversarial networks for multivariate time series" arXiv: 1809.04758V3 [cs.LG] Jan. 15, 2019.

Mathews, A. W., "What AI Can Do in Healthcare—and What It Should Never Do," The Wall Street Journal, published on Aug. 21, 2024, retrieved on Sep. 5, 2024 https://www.wsj.com.

Mavrepis, P., et al., "XAI for All: Can Large Language Models Simplify Explainable AI?," https://arxiv.org/abs/2401.13110, Jan. 23, 2024, 10 pages.

Mezini, Programming and Execution Models for Next Generation Code Intelligence Systems (Keynote), ACM, pp. 1-2 (Year: 2021).

Mollick, E., "Latent Expertise: Everyone is in R&D," One Useful Thing, published on Jun. 20, 2024, https://www.oneusefulthing.org/p/latent-expertise-everyone-is-in-r.

Nauta, M., et al., "From Anecdotal Evidence to Quantative Evaluation Methods: A Systematic Review of Evaluating Explainable AI" ACM Computing Surveys, vol. 55 No. 13s Article 295, 2023 [retrieved Jul. 3, 2024].

Peers, M., "What California AI Bill Could Mean," The Briefing, published and retrieved Aug. 30, 2024, 8 pages, https://www.theinformation.com/articles/what-california-ai-bill-could-mean.

Rattanasawad et al, "A Review and Comparison of Rule Languages and Rule-based Inference Engines for the Semantic Web", IEEE, pp. 1-6 (Year: 2013).

Schick et al., Toolformer: Language Models Can Teach Themselves to Use Tools, 37th Conference on Neural Information Processing Systems (NeurIPS 2023); Total Pages: 13 (Year: 2023).

Schlegl, et al., "f-AnoGAN: Fast unsupervised anomaly detection with generative adversarial networks", Medical Image Analysis 54 (2019) 30-44, 2019.

Soares et al, "Explaining Deep Learning Models Through Rule-Based Approximation and Visualization", IEEE, pp. 2399-2407 (Year: 2021).

Sottara et al., "Enhancing A Production Rule Engine with Predictive Models Using PMML", ACM, pp. 39-47 (Year: 2011).

Sumuk Shashidhar et al., 'Democratizing LLMs: An Exploration of Cost-Performance Trade-offs in Self-Refined Open-Source Models', arXiv:2310.07611v2, pp. 1-15, Oct. 2023.

Sun et al, "Efficient Rule Engine for Smart Building Systems", IEEE, pp. 1658-1669 (Year: 2015).

Vartak et al "MODELDB: A System for Machine Learning Model Management", ACM, pp. 1-3 (Year: 2016).

(56) References Cited

OTHER PUBLICATIONS

Vereschak et al, "Trust in AI-assisted Decision Making: Perspectives from Those Behind the System and Those for Whom the Decision is Made", ACM, pp. 1-14 (Year: 2024).

Verma et al, "Integration of Rule based and Case based Reasoning System to Support Decision Making", IEEE, pp. 106-108 (Year: 2014).

Wang et al, "Design and realization of distributed Rule Engine for scene linkage of Internet of Things", IEEE, pp. 396-401 (Year: 2024).

Wei, Jason, et al. "Chain-of-Thought Prompting Elicits Reasoning in Large Language Models," 36th Conference on Neural Information Processing Systems (NeurIPS 2022), arXiv:2201.11903 [cs. CL], Jan. 10, 2023, 43 pages.

Yang Liu et al., 'Trustworthy LLMS: A Survey and Guideline for Evaluating Large Language Models' Alignment', arXiv:2308. 05374v2, pp. 1-81, Mar. 2024.

Yuan et al., R-Judge: Benchmarking Safety Risk Awareness for LLM Agents, arXiv:2401.10019v1 [cs.CL] Jan. 18, 2024; Total Pages: 23 (Year: 2024).

Zhang et al, "Developing A Rule Engine for Automated Feature Recognition from CAD Models", IEEE, pp. 3925-3930 (Year: 2009).

Zhao, H., et al., "Explainability for Large Language Models: A Survey," https://arxiv.org/abs/2309.01029, Nov. 28, 2024, 38 pages.

Zhou, Y., Liu, Y., Li, X., Jin, J., Qian, H., Liu, Z., Li, C., Dou, Z., Ho, T., & Yu, P. S. (2024). Trustworthiness in Retrieval-Augmented Generation Systems: A Survey. ArXiv./abs/2409.10102.

"Singapore launches Project Moonshot", a generative Artificial Intelligence testing toolkit to address LLM safety and security challenges, https://www.imda.gov.sg/resources/press-releases-factsheets-and-speeches/press-releases/2024/sg-launches-project-moonshot, May 31, 2024, 8 pages.

Aggarwal, Nitin, KPIs for gen AI: Why measuring your new AI is essential to its success, https://cloud.google.com/transform/kpis-for-gen-ai-why-measuring-your-new-ai-is-essential-to-its-success.

Anthrop/C, Mapping the Mind of a Large Language Model, https://www.anthropic.com/research/mapping-mind-language-model, May 21, 2024.

Claburn, Thomas, OpenAI's GPT-4 can exploit real vulnerabilities by reading security advisories, The Register, https://www.theregister.com/2024/04/17/gpt4_can_exploit_real_vulnerabilities/?utm_source=tldrai, Apr. 17, 2024, 3 pages.

Marshall, Andrew, Threat Modeling AI/ML Systems and Dependencies, Nov. 2, 2022, 27 pages.

Roose, Kevin, "A.I. Has a Measurement Problem", The New York Times, Apr. 15, 2024, 5 pages.

Roose, Kevin, "A.I.'s Black Boxes Just Got a Little Less Mysterious", The New York Times, May 21, 2024, 5 pages.

Shah, Harshay, Decomposing and Editing Predictions by Modeling Model Computation, arXiv:2404.11534v1 [cs.LG] Apr. 17, 2024.

Shankar, Ram, "Failure Modes in Machine Learning", , Nov. 2019, 14 pages.

* cited by examiner

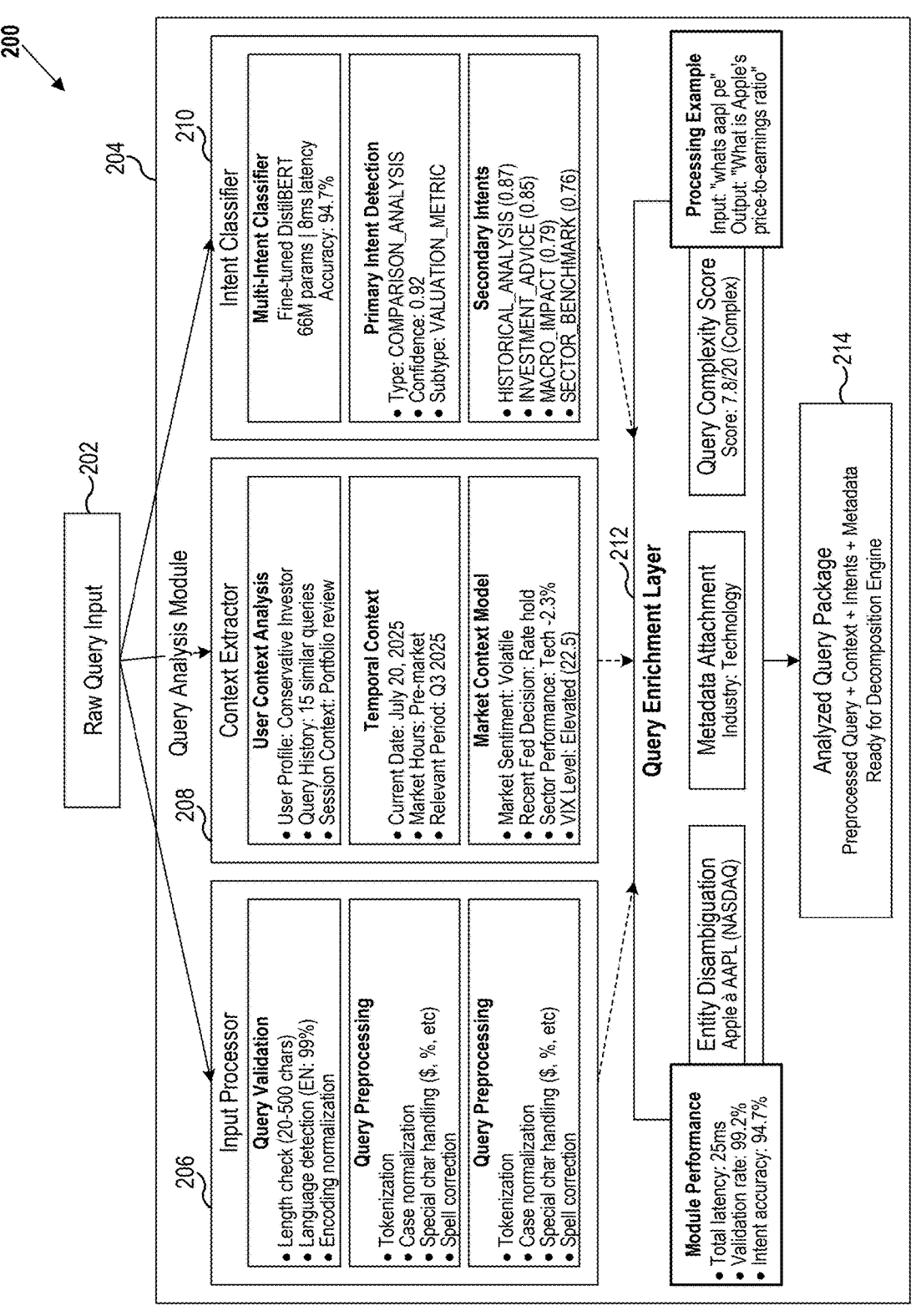

200

204

202 Raw Query Input

Query Analysis Module

206 Input Processor

Query Validation
- Length check (20-500 chars)
- Language detection (EN: 99%)
- Encoding normalization

Query Preprocessing
- Tokenization
- Case normalization
- Special char handling ($, %, etc)
- Spell correction

Query Preprocessing
- Tokenization
- Case normalization
- Special char handling ($, %, etc)
- Spell correction

208 Context Extractor

User Context Analysis
- User Profile: Conservative Investor
- Query History: 15 similar queries
- Session Context: Portfolio review

Temporal Context
- Current Date: July 20, 2025
- Market Hours: Pre-market
- Relevant Period: Q3 2025

Market Context Model
- Market Sentiment: Volatile
- Recent Fed Decision: Rate hold
- Sector Performance: Tech -2.3%
- VIX Level: Elevated (22.5)

210 Intent Classifier

Multi-Intent Classifier
Fine-tuned DistilBERT
66M params | 8ms latency
Accuracy: 94.7%

Primary Intent Detection
- Type: COMPARISON_ANALYSIS
- Confidence: 0.92
- Subtype: VALUATION_METRIC

Secondary Intents
- HISTORICAL_ANALYSIS (0.87)
- INVESTMENT_ADVICE (0.85)
- MACRO_IMPACT (0.79)
- SECTOR_BENCHMARK (0.76)

Processing Example
Input: "whats aapl pe"
Output: "What is Apple's price-to-earnings ratio"

Query Complexity Score
Score: 7.8/20 (Complex)

212 Query Enrichment Layer

Metadata Attachment
Industry: Technology

Entity Disambiguation
Apple à AAPL (NASDAQ)

Module Performance
- Total latency: 25ms
- Validation rate: 99.2%
- Intent accuracy: 94.7%

214 Analyzed Query Package
Preprocessed Query + Context + Intents + Metadata
Ready for Decomposition Engine

Request Segment
902

Domain-specific Model 904

Candidate Query Fragment A
906a

Candidate Query Fragment B
906b

Estimated Metrics A  908a

Compliance

Speed

Token Usage

. . .

Estimated Metrics B  908b

Compliance

Speed

Token Usage

. . .

Selected Query Fragment
914

Domain-Specific
Guidelines
912

Domain-Specific
Training Data
910

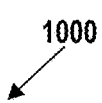

1000

1002

Receive, from a user, a query comprising a request relating to a particular domain

1004

Determine, based on the query, a set of sub-queries using a decomposition model trained to determine sub-queries

1006

Input the set of sub-queries into a routing model to determine a set of specialized models for the set of sub-queries, wherein the routing model is trained to assign sub-queries for input into a set of specialized models according to one or more routing strategies

1008

Route each sub-query to a respective specialized model in the set of specialized models

1010

Input each sub-query into the respective specialized model to generate an output

1012

Assign, to each respective output, a confidence score

1014

Generate an aggregated output by combining the set of outputs according to (i) a weighted aggregation algorithm that prioritizes outputs with higher confidence scores and (ii) a plurality of conflict resolution rules

1016

Cause display of the aggregated output in response to the query

1052

Obtain an output generation request including an instruction for generation of an output using an artificial intelligence (AI) model

1054

Partition the output generation request into one or more segments by associating the output generation request to a set of domains indicating (1) a set of databases and (2) a set of guidelines associated with the set of databases

1056

Route each of the one or more segments to a set of domain-specific models

1058

Generate, using the set of domain-specific models, a query fragment for each domain-specific model by using one or more of: (1) a set of performance metric values associated with using the query fragment to retrieve domain-specific data from the set of databases or (2) a set of system resource metric values indicating an estimated usage of system resources to retrieve the domain-specific data using the query fragment

1060

Aggregate, using the AI model, the query fragments into an overall query configured to satisfy the set of guidelines associated with each database of the set of domains

| | |
|---|---|
| Input component(s) 1104 | Network connection component(s) 1116 |
| Output component(s) 1106 | Persistent storage(s) 1118 |
| Processor(s) 1108 | Computer-readable media drive(s) 1120 |

Storage(s) 1110

Application(s) 1112

| Application 1112a | Application 1112b | ... | Application 1112n |
|---|---|---|---|

Model(s) 1114

| Model 1114a | Model 1114b | ... | Model 1114n |
|---|---|---|---|

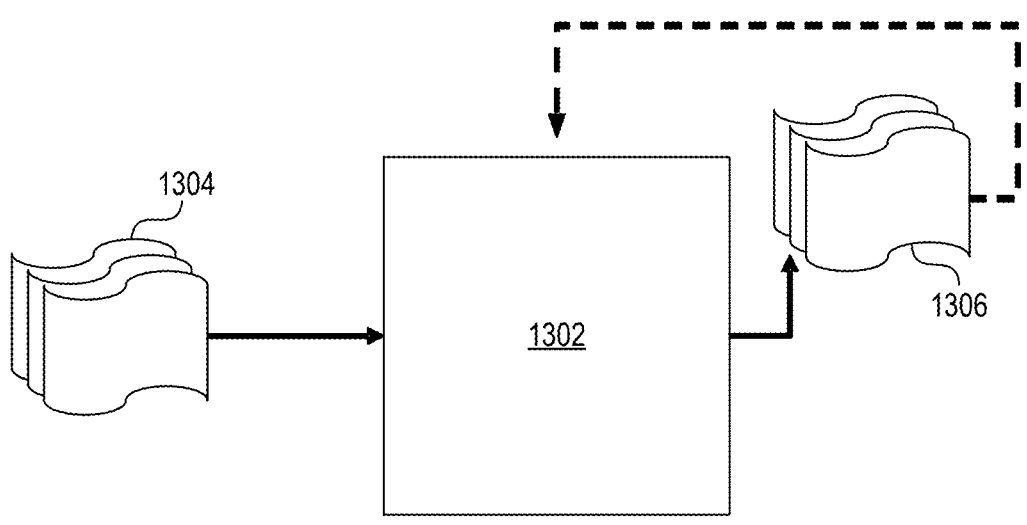
*FIG. 13*

INTELLIGENT QUERY DECOMPOSITION, SPECIALIZED MODEL ROUTING, AND HIERARCHICAL AGGREGATION WITH CONFLICT RESOLUTION

CROSS-REFERENCE TO RELATED APPLICATIONS

This application is a continuation-in-part of U.S. patent application Ser. No. 19/301,756 entitled "MULTI-VARIABLE OPTIMIZATION FOR ROUTING REQUESTS TO LANGUAGE MODELS" filed on Aug. 15, 2025, which is a continuation-in-part of U.S. patent application Ser. No. 18/812,913 entitled "DYNAMIC SYSTEM RESOURCE-SENSITIVE MODEL SOFTWARE AND HARDWARE SELECTION" and filed Aug. 22, 2024, which is a continuation-in-part of U.S. patent application Ser. No. 18/661,532 entitled "DYNAMIC INPUT-SENSITIVE VALIDATION OF MACHINE LEARNING MODEL OUTPUTS AND METHODS AND SYSTEMS OF THE SAME" and filed May 10, 2024, which is a continuation-in-part of U.S. patent application Ser. No. 18/661,519 entitled "DYNAMIC, RESOURCE-SENSITIVE MODEL SELECTION AND OUTPUT GENERATION AND METHODS AND SYSTEMS OF THE SAME" and filed May 10, 2024, and is a continuation-in-part of U.S. patent application Ser. No. 18/633,293 entitled "DYNAMIC EVALUATION OF LANGUAGE MODEL PROMPTS FOR MODEL SELECTION AND OUTPUT VALIDATION AND METHODS AND SYSTEMS OF THE SAME" and filed Apr. 11, 2024. This application is related to U.S. patent application Ser. No. 18/653,858 entitled "VALIDATING VECTOR CONSTRAINTS OF OUTPUTS GENERATED BY MACHINE LEARNING MODELS" and filed May 2, 2024, and U.S. patent application Ser. No. 18/637,362 entitled "DYNAMICALLY VALIDATING AI APPLICATIONS FOR COMPLIANCE" filed on Apr. 16, 2024.

This application is further a continuation-in-part of U.S. patent application Ser. No. 19/227,442 entitled "QUERYING DATA USING SPECIALIZED AND GENERALIZED ARTIFICIAL INTELLIGENCE MODELS" and filed Jun. 3, 2025, which is a continuation of U.S. patent application Ser. No. 19/061,848 entitled "QUERYING DATA USING SPECIALIZED AND GENERALIZED ARTIFICIAL INTELLIGENCE MODELS" and filed Feb. 24, 2025, which is a continuation-in-part of U.S. patent application Ser. No. 18/983,342 entitled "VALIDATING AUTONOMOUS ARTIFICIAL INTELLIGENCE (AI) AGENTS USING GENERATIVE AI" and filed Dec. 17, 2024, which is a continuation-in-part of U.S. patent application Ser. No. 18/653,858 entitled "VALIDATING VECTOR CONSTRAINTS OF OUTPUTS GENERATED BY MACHINE LEARNING MODELS" and filed May 2, 2024, which is a continuation-in-part of U.S. patent application Ser. No. 18/637,362 entitled "DYNAMICALLY VALIDATING AI APPLICATIONS FOR COMPLIANCE" filed on Apr. 16, 2024. U.S. patent application Ser. No. 19/061,848 is further a continuation-in-part of U.S. patent application Ser. No. 18/661,532 entitled "DYNAMIC INPUT-SENSITIVE VALIDATION OF MACHINE LEARNING MODEL OUTPUTS AND METHODS AND SYSTEMS OF THE SAME" and filed May 10, 2024, which is a continuation-in-part of U.S. patent application Ser. No. 18/661,519 entitled "DYNAMIC, RESOURCE-SENSITIVE MODEL SELECTION AND OUTPUT GENERATION AND METHODS AND SYSTEMS OF THE SAME" and filed May 10, 2024, and is a continuation-in-part of U.S. patent application Ser.

No. 18/633,293 entitled "DYNAMIC EVALUATION OF LANGUAGE MODEL PROMPTS FOR MODEL SELECTION AND OUTPUT VALIDATION AND METHODS AND SYSTEMS OF THE SAME" and filed Apr. 11, 2024.

The content of the foregoing applications is incorporated herein by reference in its entirety.

BACKGROUND

Large language models are computational systems designed to understand and generate human-like text by processing vast amounts of textual data. These models utilize deep learning architectures, particularly transformer networks, to learn patterns in language and can perform various tasks such as text completion, translation, summarization, and question answering. They are trained on diverse datasets containing billions of words from books, articles, websites, and other text sources, enabling them to develop a sophisticated understanding of linguistic structures, context, and semantic relationships.

Model routing and orchestration involve the coordination and management of multiple computational models or services to handle different aspects of a complex task. This approach allows systems to use models that excel at particular types of problems rather than relying on a single model. Routing decisions can be based on various factors including model performance characteristics, computational requirements, domain expertise, and real-time system conditions.

SUMMARY

Current large language model (LLM) systems face several technical challenges when processing complex queries that require specialized domain knowledge and multi-faceted analysis. Traditional LLM systems process entire queries as single monolithic units, leading to suboptimal responses for questions that contain multiple distinct components requiring different types of expertise. For example, a complex query can simultaneously require data retrieval, numerical calculations, regulatory compliance analysis, and strategic recommendations, yet conventional systems attempt to handle all these diverse requirements through a single generalized model.

Generic models lack access to domain-specific data and specialized knowledge that can be critical for accurate responses in technical fields. These systems cannot leverage the benefits of smaller, purpose-built models that have been fine-tuned on specific datasets or trained to excel at particular types of tasks. Additionally, conventional systems suffer from high latency issues because large models require significant processing time for even simple sub-components of a query, impacting real-time applications where speed is essential. Cost inefficiency represents another significant technical problem, as conventional systems waste computational resources by using large, expensive models to process simple sub-tasks that can be handled more efficiently by smaller specialized models. Furthermore, static routing systems cannot learn from usage patterns or adapt to changing requirements, limiting their ability to optimize performance over time.

Moreover, existing systems are unable to efficiently harmonize and combine results from multiple models because they lack sophisticated conflict resolution mechanisms and contextual understanding capabilities. When multiple specialized models generate responses to related queries, conventional systems typically employ simple concatenation or basic voting schemes that fail to address semantic inconsistencies, factual contradictions, or varying confidence levels across different model outputs. This leads to fragmented responses in which contradictory information appears without resolution, creating confusion for users or incompatible data points. Furthermore, traditional aggregation approaches cannot preserve the specialized insights and domain-specific nuances that individual models provide, often resulting in oversimplified or diluted final outputs that lose the precision and expertise that specialized models were designed to deliver. The absence of hierarchical synthesis capabilities means that existing systems cannot maintain coherent narrative flow while integrating diverse types of information, such as combining quantitative analysis with qualitative assessments or merging technical specifications with strategic recommendations in a logically structured manner.

The disclosed system overcomes these technical problems through an intelligent query decomposition and parallel routing architecture that breaks complex queries into subcomponents and processes them simultaneously using specialized models optimized for specific tasks. The system employs fine-tuned small language models trained on domain-specific data to achieve efficient decomposition with reduced latency while maintaining high accuracy through purpose-built models. The technical solution implements a multi-strategy decomposition engine that utilizes multiple parallel approaches including semantic analysis, syntactic parsing, task-based categorization, and domain-specific pattern recognition. This comprehensive decomposition approach ensures that complex queries are broken down into optimal sub-components that can be processed by the most appropriate specialized models.

A dynamic parallel routing system addresses the technical challenges of model selection by implementing multiple routing strategies that consider performance metrics, cost optimization, domain expertise, and adaptive learning based on historical performance. This approach enables the system to balance computational efficiency with accuracy requirements while continuously improving routing decisions through machine learning techniques. The system further addresses technical challenges through a hierarchical aggregation mechanism with intelligent conflict resolution that synthesizes parallel results while maintaining semantic coherence and preserving specialized insights from domain-specific models. This aggregation approach resolves discrepancies between different model outputs through confidence-weighted analysis and context-aware synthesis.

In particular, the disclosed system can receive, from a user, a query including a request relating to a particular domain. The system can determine, based on the query, a set of sub-queries using a decomposition model trained to determine sub-queries based on one or more of semantic boundaries, syntactics, tasks, relationships, and rules relating to particular domains. For example, the decomposition model can identify semantic boundaries within the request by recognizing distinct conceptual units or can parse syntactic elements such as clauses, modifiers, and logical operators to understand the structural components of the query.

The system can input the set of sub-queries into a routing model to determine a set of specialized models for the set of sub-queries. In particular, the routing model is trained to assign sub-queries for input into a set of specialized models according to one or more routing strategies that balance or prioritize a plurality of factors. In some implementations, these routing strategies can include performance-based routing that prioritizes latency requirements and accuracy thresholds, cost-optimized routing that balances computational costs with quality requirements, domain expertise routing that prioritizes expertise of the specialized models, and learning-based routing that updates based on historical performance and real-time feedback.

For each particular sub-query in the set of sub-queries, the system can route the particular sub-query to a respective specialized model in the set of specialized models. The system can input the particular sub-query into the respective specialized model to generate an output and can assign, to each respective output, a confidence score based on a reliability of the respective specialized model, a complexity of the particular sub-query, and a relevance of the respective output. For example, the confidence scoring mechanism enables the system to weight responses appropriately during the aggregation process, ensuring that more reliable outputs from proven models receive higher priority.

The system can detect a conflict among a set of outputs generated for the set of sub-queries. In particular, the conflict is detected using a conflict detection model configured to identify logical, factual, or semantic discrepancies among outputs, and the conflict includes a discrepancy between two outputs of the set of outputs. This conflict detection capability addresses the technical challenge of reconciling potentially contradictory information from different specialized models.

Moreover, the system can generate an aggregated output by combining the set of outputs according to a weighted aggregation algorithm that prioritizes outputs with higher confidence scores and a plurality of conflict resolution rules. In particular, the aggregated output resolves the conflict between the two outputs. The system can cause display of the aggregated output in response to the query, thus providing a unified response that leverages the specialized capabilities of multiple models while resolving discrepancies through intelligent synthesis.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 2 illustrates an architecture of a query analysis system, according to some implementations to the disclosed technology.

FIG. 10A is a flow diagram illustrating an example process of query decomposition and parallel routing, according to some implementations to the disclosed technology.

FIG. 10B is a flow diagram illustrating an example process of dynamically selecting models for distributed data queries, according to some implementations to the disclosed technology.

FIG. 13 shows a diagram of an artificial intelligence (AI) model, according to some implementations to the disclosed technology.

Figure 1:
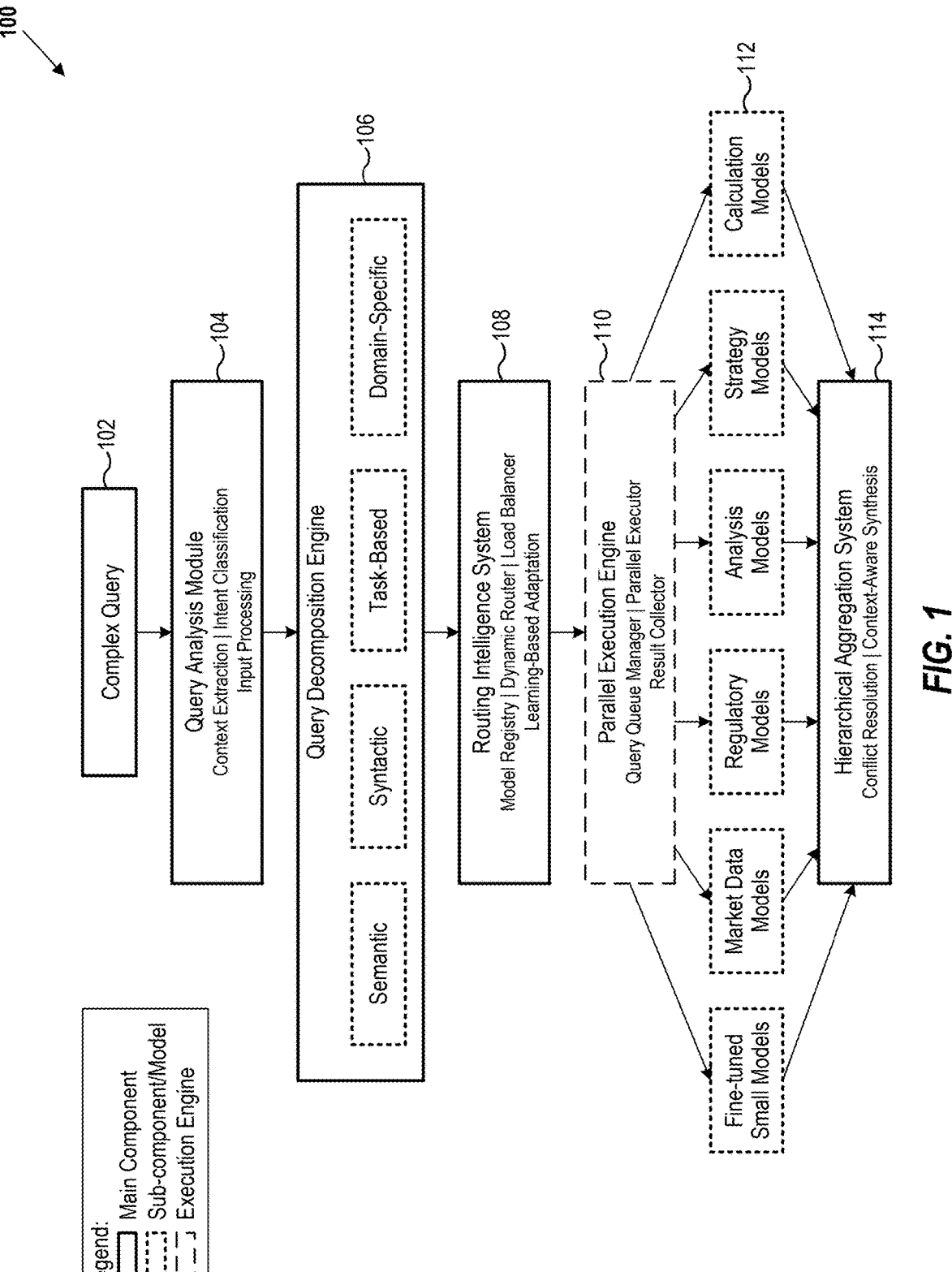
FIG. 1 illustrates a block diagram of a query decomposition and parallel routing system, according to some implementations to the disclosed technology.

The technologies described herein will become more apparent to those skilled in the art from studying the Detailed Description in conjunction with the drawings. Implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In the following description, for the purposes of explanation, numerous specific details are set forth in order to provide a thorough understanding of the disclosed implementations. It will be appreciated, however, by those having skill in the art, that the implementations can be practiced without these specific details or with an equivalent arrangement. In other cases, well-known models and devices are shown in block diagram form in order to avoid unnecessarily obscuring the disclosed implementations. It should also be noted that the methods and systems disclosed herein are also suitable for applications unrelated to intelligent query decomposition, specialized model routing, or hierarchical aggregation.

The disclosed technology provides a system and method for intelligent query decomposition, specialized model routing, and hierarchical aggregation with conflict resolution. In particular, systems and methods described herein involve breaking complex queries into atomic sub-components, processing them simultaneously using specialized models optimized for specific tasks, and synthesizing the results while resolving conflicts. Specifically, the present disclosure will be directed to using a multi-strategy decomposition engine that utilizes multiple parallel approaches including semantic analysis, syntactic parsing, task-based categorization, and domain-specific pattern recognition; a dynamic parallel routing system that implements multiple routing strategies considering performance metrics, cost optimization, domain expertise, and adaptive learning; and a hierarchical aggregation mechanism with intelligent conflict resolution that synthesizes parallel results while maintaining semantic coherence and preserving specialized insights from domain-specific models.

The system can receive a query from a user including a request relating to a particular domain, determine a set of sub-queries using a decomposition model, input the sub-queries into a routing model to determine specialized models, route each sub-query to a respective specialized model to generate outputs with confidence scores, detect conflicts among outputs, generate an aggregated output that resolves conflicts using a weighted aggregation algorithm and conflict resolution rules, and display the aggregated output in response to the query. This approach enables the system to leverage specialized capabilities of multiple models while resolving discrepancies through intelligent synthesis.

The system can utilize various types of models (e.g., LLMs, small language models (SLMs), retrieval-augmented generation (RAG) procedures, fine-tuned models, neural networks, Bayesian models, or other types of models) within the routing architecture to optimize performance across different query types and computational requirements. LLMs can be employed for complex reasoning tasks that require extensive world knowledge and sophisticated language understanding, such as multi-step analytical queries or nuanced interpretation of ambiguous requests. SLMs with fewer parameters can be utilized for specific, well-defined tasks where computational efficiency is prioritized, such as entity extraction, classification, or simple factual retrieval, enabling faster response times and reduced resource consumption. RAG procedures can be integrated to combine the generative capabilities of language models with access to external knowledge bases, allowing the system to provide up-to-date information and domain-specific facts that are not present in the model's training data.

FIG. 1 illustrates a block diagram 100 of a query decomposition and parallel routing system, according to some implementations to the disclosed technology. The system receives a complex query 102 (for example, "What are the technical specifications of the latest smartphone model compared to industry standards, how have they evolved since the previous generation, and should I upgrade considering the recent technological advancements?") and processes it through a query analysis module 104 that extracts context, classifies intent, and preprocesses the input. The analyzed query is then passed to a query decomposition engine 106, which employs a decomposition model to determine sub-queries based on semantic boundaries, syntactics, tasks, relationships, and rules relating to particular domains. The decomposed sub-queries are directed to a routing intelligence system 108 that utilizes a routing model to assign sub-queries for input into specialized models according to various routing strategies. The parallel execution engine 110 manages simultaneous processing of sub-queries across specialized models 112, which may include domain-specific models fine-tuned for particular tasks such as technical analysis, regulatory compliance, or numerical calculations. Finally, the hierarchical aggregation system 114 implements a weighted aggregation algorithm that prioritizes outputs with higher confidence scores and applies conflict resolution rules to generate a coherent response that resolves any discrepancies between model outputs. This architecture enables significant performance improvements by processing complex queries in parallel while maintaining semantic coherence in the final response.

In some implementations, the system receives, from a user, a query including a request relating to a particular domain. For example, the query can be a complex question that contains multiple distinct components requiring different types of expertise. The query can be received through various interfaces including web applications, mobile applications, voice assistants, or application programming interfaces (APIs). The particular domain can include technical fields such as healthcare, legal, scientific research, engineering, or other specialized areas that require domain-specific knowledge. For instance, a query in the healthcare domain can ask about treatment options, medication interactions, and success rates for a specific condition, while a query in the engineering domain can request structural analysis, material properties, and regulatory compliance information for a construction project.

FIG. 2 illustrates an architecture 200 of a query analysis system (for example, query analysis module 104 of FIG. 1), according to some implementations to the disclosed technology. The query analysis system receives a raw query input 202 and processes it through multiple specialized components of a query analysis module 204 to prepare it for decomposition. The input processor 206 performs critical preprocessing functions including query validation, tokenization, and normalization that ensure the query is properly formatted before further analysis. In some implementations, the input processor performs length checks to ensure the query is within acceptable parameters, language detection to identify the query's primary language, and encoding normalization to standardize character representations. The context extractor 208 extracts context relating to both the user and a query session by analyzing user profile information, query history, and session context while also incorporating temporal and domain-specific contextual data. For example, the context extractor can identify that a user has previously asked related questions about a specific technology, indicating a continuing interest in that subject.

The intent classifier 210 classifies one or more intents associated with the query by detecting both primary and secondary intents within complex queries, assigning confidence scores to each detected intent. These components feed processed information to the query enrichment layer 212, which performs entity disambiguation, metadata attachment, and query complexity scoring. The system outputs an analyzed query package 214 containing the preprocessed query combined with context, intents, and metadata, which provides the necessary enriched information to determine a set of sub-queries. The architecture's modular design enables parallel processing of different analytical aspects, improving system efficiency while maintaining comprehensive query understanding.

In some implementations, the system determines, based on the query, a set of sub-queries using a decomposition model. The decomposition model can be trained to determine sub-queries based on one or more of semantic boundaries, syntactics, tasks, relationships, and rules relating to particular domains. The decomposition model can be a machine learning model specifically trained to identify distinct components within complex queries. This model can analyze the query structure to recognize where one logical unit ends and another begins. For example, when processing a query about "treatment options for diabetes, their success rates, and potential side effects," the decomposition model can identify three distinct sub-queries: one about treatment options, another about success rates, and a third about side effects. In some implementations, the decomposition model utilizes fine-tuned small language models trained on domain-specific data to achieve efficient decomposition with reduced latency. The decomposition model can be implemented using various architectures including transformer-based models, recurrent neural networks, or hybrid approaches that combine rule-based systems with neural networks.

In some implementations, determining the set of sub-queries involves identifying semantic boundaries or conceptual units within the request. Semantic boundaries represent distinct conceptual units within a query where one idea or concept transitions to another. For example, in a query asking about "material properties and regulatory compliance," the semantic boundary exists between the material properties concept and the regulatory compliance concept. Semantic boundaries can be identified through various linguistic markers including topic shifts, conceptual transitions, and changes in subject matter focus. These boundaries often manifest at conjunction points, where terms like "and," "also," or "additionally" signal the introduction of a new conceptual unit. The decomposition model can recognize semantic boundaries by analyzing changes in entity types, such as transitions from product-related concepts to process-related concepts or from technical specifications to business implications. In healthcare queries, semantic boundaries frequently occur between diagnostic questions, treatment options, and prognosis inquiries, even when these concepts appear in a single sentence. The model can identify these boundaries by recognizing domain-specific terminology clusters that typically belong to different conceptual categories. Semantic boundaries differ from syntactic boundaries in that they focus on meaning transitions rather than grammatical structure, allowing the system to identify conceptually distinct components even when they appear within the same grammatical clause.

Determining the set of sub-queries can involve syntactics within the request, the syntactics including clauses, modifiers, or logical operators. Syntactics refer to the grammatical structure of the query, including clauses (independent and dependent), modifiers (adjectives, adverbs), and logical operators (and, or, not). The decomposition model can parse these syntactic elements to understand how different parts of the query relate to each other structurally. Syntactic analysis involves identifying independent clauses that can stand as complete thoughts, which often represent distinct query components that can be processed separately. Dependent clauses, which cannot stand alone as complete thoughts, typically provide qualifying information that modifies or elaborates on an independent clause. The model recognizes coordinating conjunctions (such as "and," "but," "or") that connect independent clauses, treating these as potential decomposition points. Subordinating conjunctions (such as "because," "although," "when") introduce dependent clauses that may need to be processed in conjunction with their associated independent clauses. Logical operators serve as particularly important syntactic markers for decomposition, as they explicitly indicate relationships between different parts of a query. For example, the "and" operator often signals parallel requirements that can be processed independently, while the "or" operator indicates alternative scenarios that may require separate processing paths. Conditional operators like "if-then" constructs create complex syntactic relationships where the processing of one component depends on the outcome of another, requiring specialized decomposition approaches.

In some implementations, determining the set of sub-queries can involve tasks indicated by the request. Tasks indicated by the request can include data retrieval, calculation, analysis, comparison, or recommendation tasks that require different processing approaches. Data retrieval tasks focus on extracting specific information from databases or knowledge bases, such as "What is the boiling point of water?" Calculation tasks require mathematical operations on numerical data, such as "Calculate the compound annual growth rate for this investment over five years." Analysis tasks involve examining relationships, patterns, or implications within data, such as "Analyze the impact of recent regulatory changes on pharmaceutical companies." Comparison tasks require evaluating similarities and differences between multiple entities or concepts, such as "Compare the energy efficiency of these three HVAC systems." Recommendation tasks involve providing guidance or suggestions based on specific criteria, such as "What investment strategy would be most appropriate given my risk tolerance?" The decomposition model identifies these task types through linguistic cues, including specific verbs (calculate, analyze, compare), question structures, and contextual indicators that signal the expected action type. By recognizing the distinct task types embedded within a complex query, the system can route each component to specialized models optimized for those specific operations.

The system can determine entities and relationships between the entities from the request. Entities and relationships involve identifying specific named entities (people, organizations, products) and understanding how they relate to each other within the query context. Entity recognition encompasses the identification of domain-specific objects such as medications, financial instruments, legal statutes, or technical components that appear in the query. The decomposition model employs specialized entity recognition capabilities trained on domain-specific terminologies to accurately identify these entities even when they involve technical jargon or specialized nomenclature. Relationship identification focuses on understanding how these entities interact or connect with each other within the query context. Relationships can be explicitly stated through verbs or prepositions, such as "affects," "causes," "belongs to," or "depends on," which directly indicate how entities relate to each other. Implicit relationships may be inferred from domain knowledge even when not explicitly stated in the query, such as understanding that a medication and a side effect have a potential causative relationship. Hierarchical relationships indicate containment or categorization, such as a product belonging to a product line or a legal case falling under a specific jurisdiction. Temporal relationships express time-based connections between entities, such as "before," "after," or "during," which can be critical for proper query interpretation. Causal relationships indicate that one entity influences or determines another, which is particularly important in analytical queries. By mapping these entity relationships, the decomposition model can identify distinct relationship-based components that require specialized processing, such as routing queries about medication interactions to pharmaceutical knowledge models while sending dosage calculations to medical calculation models.

In some implementations, the system determines rules specific to components of the request to determine the set of sub-queries. The system can determine the set of sub-queries based on one or more of the semantic boundaries, the syntactics, the tasks, the entities and the relationships, and the rules. Rules specific to components can include domain-specific guidelines for handling certain types of questions or terminology in specialized fields. In the healthcare domain, rules may dictate that medication dosage questions must be decomposed into separate sub-queries addressing patient characteristics (age, weight, kidney function) and medication properties (standard dosing, contraindications) to ensure comprehensive safety checks. Financial domain rules may require that investment recommendation queries be decomposed into separate risk assessment, market analysis, and portfolio alignment components to ensure regulatory compliance with "know your customer" requirements. Legal domain rules often mandate that case analysis queries be decomposed into jurisdictional analysis, precedent identification, and statutory interpretation components to ensure proper legal reasoning. Engineering domain rules may specify that structural analysis queries must separate material property assessment, load calculation, and safety factor determination to maintain compliance with industry standards. Regulatory domain rules can require that compliance queries be decomposed into applicable regulation identification, requirement extraction, and gap analysis components. These domain-specific rules are encoded into the decomposition model through specialized training on domain-specific datasets and explicit rule implementation. The rules can vary significantly across domains, reflecting the unique requirements, terminology, and analytical approaches of each specialized field. For example, healthcare queries involving treatment recommendations must always include separate safety and efficacy components, while financial queries about investment strategies must include risk assessment and time horizon components.

The training methodology for decomposition models can involve steps to ensure optimal performance. For example, data collection gathers query logs from actual user interactions across various domains, providing authentic examples of complex queries that require decomposition. In some implementations, an annotation process involves domain experts who label query decomposition boundaries, identifying where semantic, syntactic, and task-based divisions should occur within each query. These annotations create a high-quality training dataset that captures the nuanced ways queries should be broken down. The model training phase involves fine-tuning small transformer models (e.g., ranging from 125M to 1B parameters) on this annotated data, using techniques such as transfer learning from pre-trained language models. Finally, validation testing on held-out data query sets measures decomposition accuracy, boundary precision, and processing latency to ensure the models perform effectively on unseen queries. This rigorous training methodology enables the system to achieve high decomposition accuracy rates while maintaining low latency, making it suitable for real-time applications.

The decomposition models can employ specific architectural designs optimized for query analysis tasks. The semantic analyzer utilizes fine-tuned BERT-based models (Bidirectional Encoder Representations from Transformers), trained on domain-specific terminology to recognize conceptual boundaries. These models implement a modified attention mechanism that gives higher weight to transition words and phrase boundaries that signal concept shifts. For example, the syntactic analyzer employs a hybrid architecture combining constituency parsing with dependency parsing, using a fine-tuned T5 (Text-to-Text Transfer Transformer) model for identifying clause boundaries and logical operators. For task identification, the system implements a specialized classifier based on DistilBERT architecture that categorizes query segments into predefined task types. Domain-specific analyzers utilize adapter-based fine-tuning approaches that add small domain-specific layers to pre-trained models, enabling efficient specialization without requiring full model retraining. These architectural choices balance computational efficiency with decomposition accuracy, enabling the system to process complex queries with both speed and precision.

Figure 3:
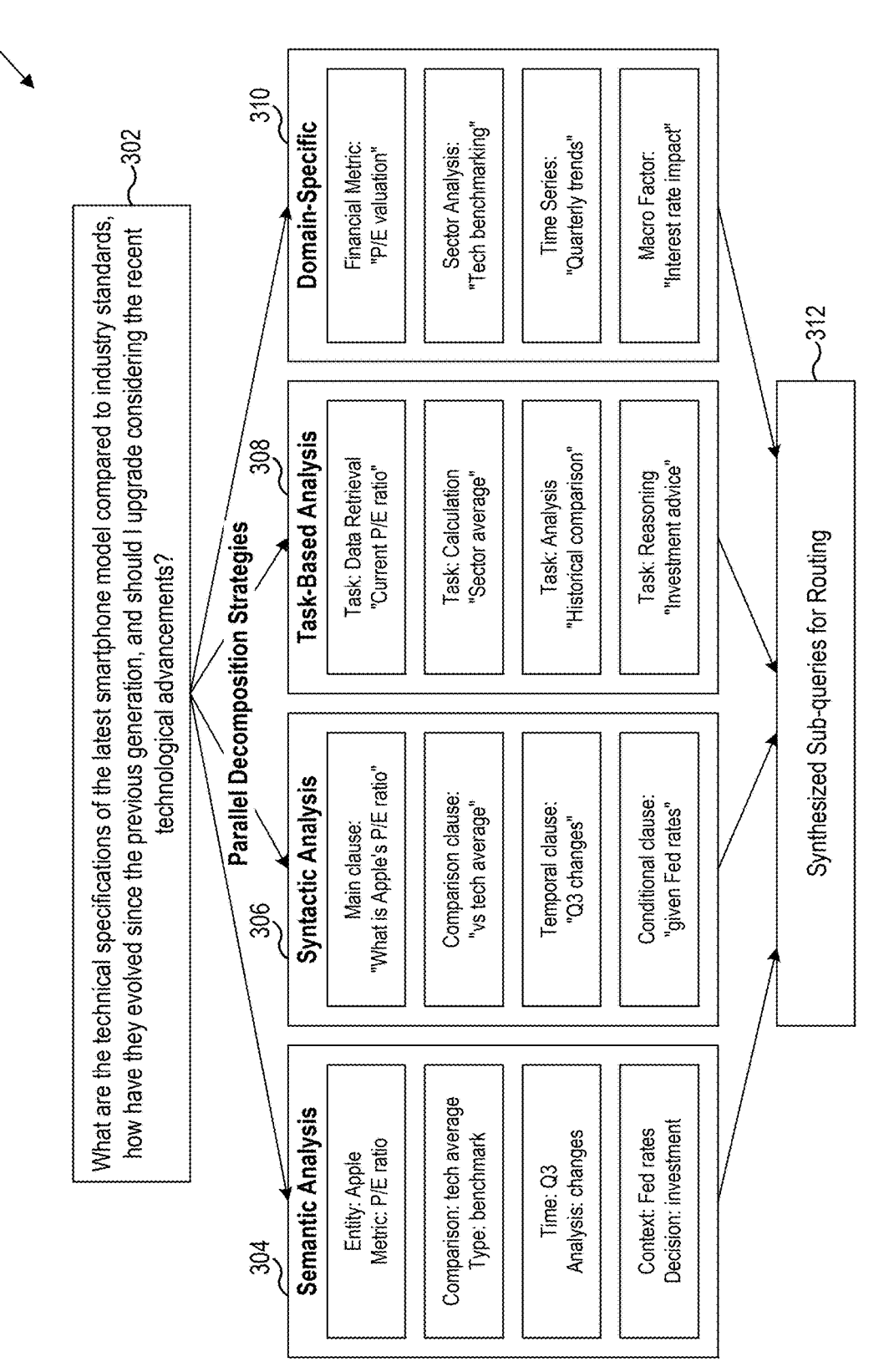
FIG. 3 illustrates a query decomposition process for analyzing complex queries, according to some implementations to the disclosed technology.

FIG. 3 illustrates a query decomposition process 300 for analyzing complex queries (for example, query decomposition engine 106 of FIG. 1), according to some implementations to the disclosed technology. The query decomposition process 300 implements a decomposition model trained to determine sub-queries through a multi-strategy parallel approach. The system receives an input query 302 (exemplified by "What are the technical specifications of the latest smartphone model compared to industry standards, how have they evolved since the previous generation, and should I upgrade considering the recent technological advancements?") and processes it through four specialized analyzers operating in parallel. The semantic analyzer 304 identifies distinct conceptual units within the query by recognizing entity boundaries, metric identifications, comparison types, and contextual decision elements, directly implementing the functionality of identifying semantic boundaries or conceptual units within the request. For example, the semantic analyzer can identify "technical specifications," "industry standards," and "technological advancements" as distinct conceptual units requiring separate processing.

The syntactic analyzer 306 parses grammatical structures including main clauses, comparison clauses, temporal clauses, and conditional clauses, corresponding to the identification of syntactics within the request, including clauses, modifiers, or logical operators. In some implementations, the syntactic analyzer can identify that the example query contains three main clauses connected by coordinating conjunctions, with each clause requiring different types of analysis. The task analyzer 308 categorizes components into operational tasks including data retrieval, calculation, analysis, and reasoning, implementing the identification of tasks indicated by the request. For instance, the first part of the query requires data retrieval of technical specifications, the second part requires comparative analysis across time periods, and the third part requires reasoning for a recommendation. The domain-specific analyzer 310 applies specialized domain knowledge to identify technical metrics, industry analysis requirements, evolutionary data needs, and technological impact factors, corresponding to the identification of rules specific to components of the request. These parallel analytical approaches converge to generate synthesized sub-queries 312 that are optimally structured for routing to specialized models, demonstrating the system's ability to determine the set of sub-queries based on semantic boundaries, syntactics, tasks, entities and relationships, and rules.

In some implementations, the system inputs the set of sub-queries into a routing model to determine a set of specialized models for the set of sub-queries, where the routing model is trained to assign sub-queries for input into a set of specialized models according to one or more routing strategies that balance or prioritize a plurality of factors. The routing model can be a machine learning system that analyzes each sub-query and determines which specialized model would be most appropriate for processing it. This model considers various factors when making routing decisions, including the nature of the sub-query, the capabilities of available specialized models, computational efficiency considerations, and historical performance data. In some implementations, the routing model implements a multi-strategy approach that considers performance metrics, cost optimization, domain expertise, and adaptive learning simultaneously. The specialized models can include domain-specific language models fine-tuned on particular datasets, numerical calculation models, data retrieval systems, analytical models, and other purpose-built processing systems. For example, a sub-query about medication interactions can be routed to a pharmaceutical knowledge model, while a sub-query about statistical significance can be routed to a specialized statistical analysis model.

The system can maintain a comprehensive model registry that catalogs and manages the inventory of available specialized models. This registry can contain detailed metadata about each model, including its capabilities, training data characteristics, performance metrics, resource requirements, and version history. For example, the registry tracks fine-tuned small models that have been optimized for specific domains or tasks, specialized calculation models designed for numerical processing, regulatory compliance models trained on legal and policy documents, market analysis models that incorporate domain-specific analytical capabilities, and general-purpose fallback models that can handle queries outside the expertise of specialized models. Each model entry includes performance benchmarks across different task types, with metrics such as accuracy, precision, recall, F1 scores, and average latency. The registry also maintains information about model dependencies, required input formats, output schemas, and compatibility with different query types. This comprehensive model registry enables the routing system to make informed decisions about which models to use for each sub-query, considering both technical capabilities and operational characteristics. The registry is dynamically updated as models are added, updated, or deprecated, ensuring that routing decisions are always based on current information about available models.

In particular, the one or more routing strategies can include a performance-based routing strategy that prioritizes latency requirements and accuracy thresholds, a cost-optimized routing strategy that balances computational costs with quality requirements, a domain expertise routing strategy that prioritizes expertise of the set of specialized models, or a learning-based routing strategy that updates based on historical performance and real-time feedback. The performance-based routing strategy focuses on meeting specific performance requirements, such as ensuring responses are generated within certain time constraints while maintaining minimum accuracy levels. For example, time-sensitive queries can be routed to faster models even if they provide slightly less detailed responses. In some implementations, this strategy can route a query requiring immediate response to a smaller, more efficient model that can respond in milliseconds rather than a larger, more comprehensive model that can take several seconds to process.

The cost-optimized routing strategy considers the computational resources required by different models, balancing processing costs against quality needs. This strategy can route simpler sub-queries to lightweight models that consume fewer resources while directing complex sub-queries to more powerful models only when necessary. For example, a simple factual sub-query can be routed to a small, efficient model that requires minimal computational resources, while a complex analytical sub-query can be routed to a more sophisticated model despite its higher computational cost.

The domain expertise routing strategy prioritizes matching sub-queries with models that have been specifically trained or optimized for relevant domains. For instance, medical questions are routed to healthcare-specialized models, while engineering questions go to models with engineering expertise. The learning-based routing strategy continuously improves routing decisions by analyzing past performance and incorporating feedback. This strategy enables the system to adapt over time, learning which models perform best for specific types of sub-queries based on actual results rather than predetermined rules. In some implementations, this strategy can initially route certain types of queries to multiple models in parallel, then gradually shift toward the models that consistently perform best for those query types.

As an illustrative example, a complex healthcare query can include "What are the potential drug interactions between lisinopril and ibuprofen, how do they affect blood pressure, and what monitoring should be implemented for elderly patients with kidney issues?" The decomposition engine breaks this into three sub-queries: (1) "What are the potential drug interactions between lisinopril and ibuprofen?" (2) "How do interactions between lisinopril and ibuprofen affect blood pressure?" and (3) "What monitoring should be implemented for elderly patients with kidney issues taking lisinopril and ibuprofen?" The routing system directs the first sub-query to a pharmaceutical database model, the second to a physiological effects model specialized in cardiovascular impacts, and the third to a clinical guidelines model trained on geriatric care protocols. In the financial domain, a query such as "What is the current price-to-earnings (P/E) ratio of Apple compared to the tech sector average, and how has it changed over the last quarter? Also, considering the recent Fed rate decisions, should I increase my position?" would be decomposed into five distinct sub-queries: (1) "Current P/E ratio of Apple," (2) "Tech sector average P/E," (3) "P/E change over last quarter," (4) "Recent Fed rate decisions," and (5) "Investment recommendation based on P/E and Fed rates." These would be routed to specialized models including a market data model, sector analysis model, historical analysis model, regulatory data model, and investment strategy model, respectively. These domain-specific examples demonstrate how the system handles complex queries across different specialized fields, leveraging appropriate domain expertise for each component of the query.

In some implementations, prior to inputting the set of sub-queries into the routing model, the system utilizes a load balancer. The load balancer can be configured to distribute the set of sub-queries across multiple instances of the set of specialized models and manage allocation of system resources to the multiple instances of the set of specialized models. For example, the load balancer can maintain a pool of model instances for each specialized model type, monitoring their current processing loads and availability. When sub-queries are ready for processing, the load balancer can direct them to specific instances based on current system conditions. The load balancer is further configured to prevent resource bottlenecks by directing each sub-query of the set of sub-queries to a selected instance of the set of specialized models based at least in part on a real-time system load and an availability of computational resources. For example, if one instance of a specialized model is currently processing multiple complex queries and experiencing high CPU utilization, the load balancer can direct new sub-queries to less-utilized instances of the same model. This dynamic allocation helps maintain consistent performance even during usage spikes and prevents any single component from becoming a bottleneck. The load balancer can implement various distribution algorithms including round-robin, least connections, weighted distribution based on instance capabilities, or predictive routing based on estimated processing times.

Figure 4:
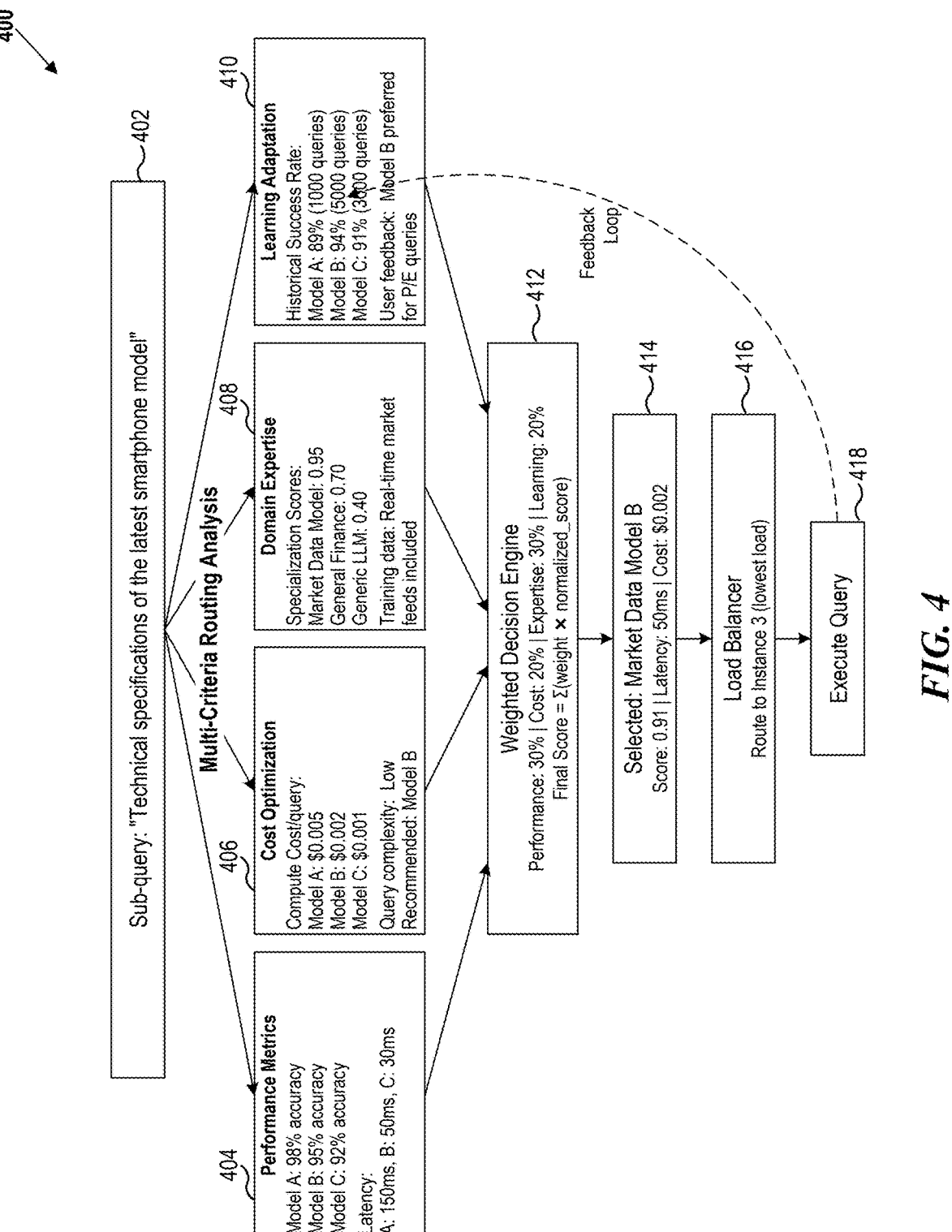
FIG. 4 illustrates a dynamic routing decision process, according to some implementations to the disclosed technology.

FIG. 4 illustrates a dynamic routing decision process 400 (for example, routing intelligence system 108 of FIG. 1), according to some implementations to the disclosed technology. The dynamic routing decision process 400 implements a routing model trained to assign sub-queries into specialized models according to multiple routing strategies through a sophisticated multi-criteria evaluation system. The process can begin with a sub-query 402 (exemplified by "Technical specifications of the latest smartphone model") that undergoes parallel evaluation across four distinct routing strategies: performance metrics 404 (implementing a performance-based routing strategy that prioritizes latency requirements and accuracy thresholds), cost optimization 406 (implementing a cost-optimized routing strategy that balances computational costs with quality requirements), domain expertise 408 (implementing a domain expertise routing strategy that prioritizes expertise of the specialized models), and learning adaptation 410 (implementing a learning-based routing strategy that updates based on historical performance and real-time feedback).

These evaluations can feed into a weighted decision engine 412 that applies configurable weights to each criterion (Performance: 30%, Cost: 20%, Expertise: 30%, Learning: 20%) to calculate a comprehensive routing score. In some implementations, these weights can be dynamically adjusted based on the query context or user preferences. The selected model 414 is determined based on this weighted analysis, with specific performance metrics tracked for continuous optimization. The architecture further incorporates a load balancer 416 that prevents resource bottlenecks by directing each sub-query to a selected instance of the specialized models based on real-time system load and resource availability. For instance, if three instances of a technical specifications model are available with loads of 80%, 45%, and 30%, respectively, the load balancer can direct the query to the instance with 30% load to ensure optimal processing speed. The query executor 418 performs the final execution while maintaining a feedback loop to the learning adaptation 410, enabling the system to continuously improve routing decisions based on actual execution results and performance metrics. This feedback mechanism allows the system to adapt to changing conditions and improve its routing decisions over time.

In particular, for each particular sub-query in the set of sub-queries, the system routes the particular sub-query to a respective specialized model in the set of specialized models. The system inputs the particular sub-query into the respective specialized model to generate an output. The system assigns, to each respective output, a confidence score based on a reliability of the respective specialized model, a complexity of the particular sub-query, and a relevance of the respective output. Routing the sub-query involves sending it to the specialized model determined by the routing model as most appropriate for that specific sub-query type. This routing can occur through internal API calls, message queues, or direct function calls depending on the system architecture. Inputting the sub-query into the specialized model involves formatting the query appropriately for the target model and initiating the processing operation.

Different specialized models can require different input formats or parameters. For example, a natural language processing model can require tokenized text, while a numerical analysis model can require structured data in a specific format. The confidence score represents the system's assessment of how reliable the output is likely to be, considering multiple factors. The reliability of the specialized model can be determined based on historical performance metrics, validation testing results, and model maturity. Models with consistently accurate outputs receive higher reliability ratings. The complexity of the sub-query affects confidence scoring because more complex queries typically have higher uncertainty. For example, a simple factual sub-query can receive a higher confidence score than a complex analytical sub-query with multiple variables. The relevance of the output measures how directly the model's response addresses the specific sub-query. Outputs that precisely answer the question receive higher relevance scores than tangentially related responses.

Figure 5:
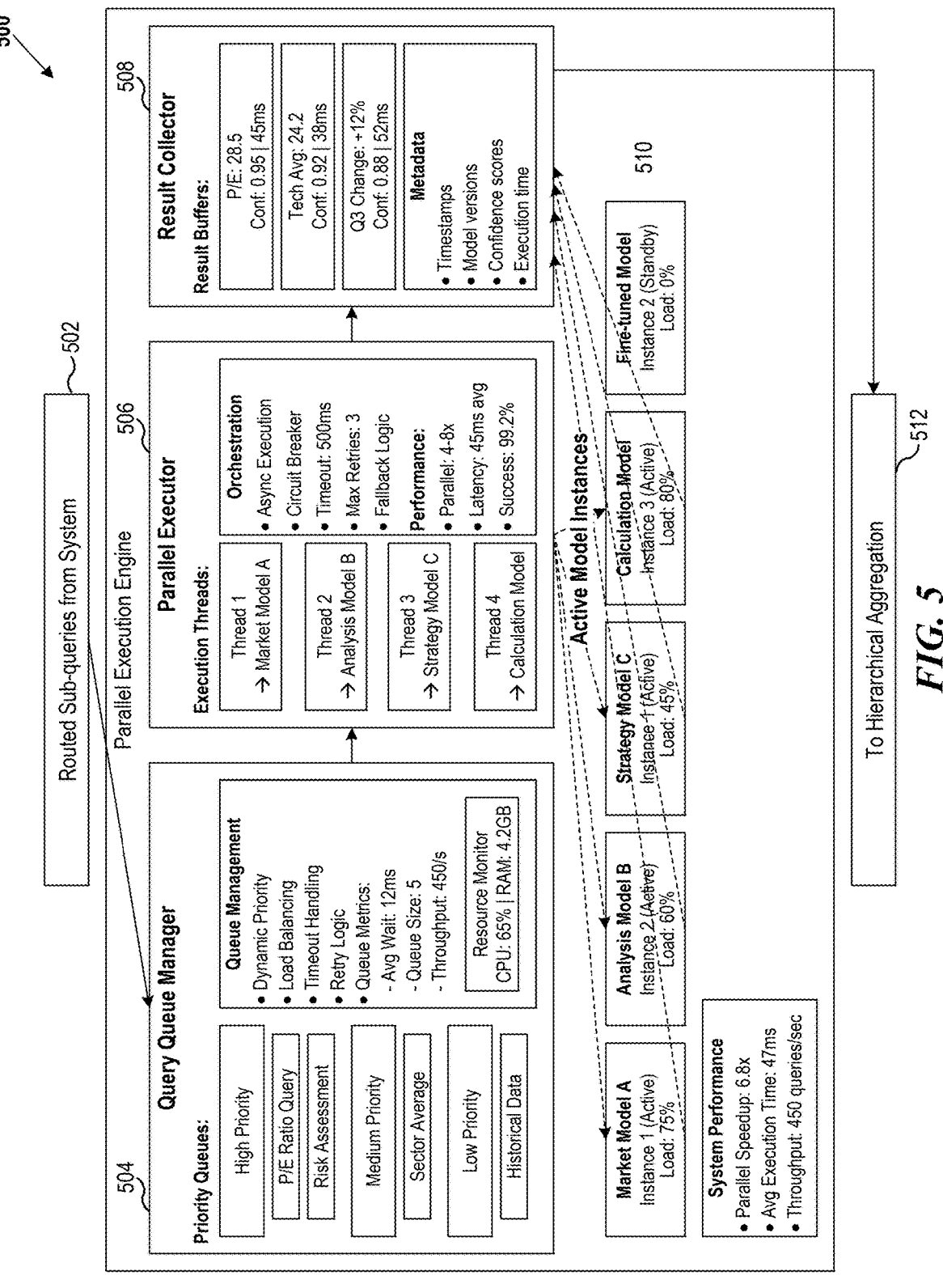
FIG. 5 illustrates a parallel execution process, according to some implementations to the disclosed technology.

FIG. 5 illustrates a parallel execution process 500 (for example, parallel execution engine 110 of FIG. 1), according to some implementations to the disclosed technology. The parallel execution process 500 implements functionality for routing each particular sub-query to a respective specialized model through a sophisticated multi-component system. The process begins with routed sub-queries 502 that have been assigned to appropriate specialized models by the routing model. These sub-queries enter the query queue manager 504, which implements priority-based queuing with dynamic priority adjustment based on query importance, latency requirements, and system load. For example, a critical sub-query about medical diagnosis information can be placed in a high-priority queue to ensure rapid processing, while a less time-sensitive background research query can be placed in a medium or low-priority queue. The parallel executor 506 manages simultaneous processing across multiple execution threads, implementing circuit breaker functionality that prevents cascading failures by monitoring model performance and terminating problematic executions. This component directly supports the functionality of inputting the particular sub-query into the respective specialized model to generate an output by orchestrating the actual execution of sub-queries across specialized model instances. In some implementations, the parallel executor can monitor execution progress and implement timeout settings to prevent long-running queries from consuming excessive resources.

The result collector 508 aggregates outputs from the parallel executions, maintaining detailed metadata including confidence scores, execution times, and model version information, which directly supports the functionality of assigning a confidence score to each respective output based on model reliability, query complexity, and output relevance. For instance, an output from a highly reliable model that directly addresses a simple query can receive a confidence score of 0.95, while an output from a less reliable model addressing a complex query can receive a score of 0.70. The architecture shows active model instances 510 with their respective load percentages, demonstrating how the system balances processing across multiple instances of specialized models to optimize throughput and prevent resource bottlenecks. Performance metrics indicate significant parallel speedup compared to sequential processing, with the system achieving 4.8× speedup with five parallel models and maintaining 95% throughput efficiency. The processed outputs 512 are directed to the hierarchical aggregation system for synthesis into a coherent response, completing the parallel execution phase of the query processing pipeline. In some implementations, the system can dynamically scale the number of model instances based on query volume and complexity to maintain optimal performance under varying load conditions.

The system detects a conflict among a set of outputs generated for the set of sub-queries. The conflict can be a discrepancy between two outputs of the set of outputs. A conflict represents a situation where different specialized models provide inconsistent or contradictory information in their outputs. The conflict detection model can be a specialized component trained to compare multiple outputs and identify inconsistencies between them. The conflict can be detected using a conflict detection model configured to identify logical, factual, or semantic discrepancies among outputs. Logical discrepancies occur when two outputs make statements that cannot both be true according to rules of logic. For example, if one output states that a particular medical treatment is always effective while another output states that the same treatment sometimes fails, this represents a logical conflict. Factual discrepancies involve contradictory factual claims, such as different numerical values, dates, or categorical assignments. For instance, if one model outputs that a material has high conductivity while another indicates low conductivity, this represents a factual conflict. In some implementations, the conflict detection model can employ natural language understanding techniques to identify subtle contradictions that can not be apparent through simple keyword matching. Semantic discrepancies are more subtle conflicts in meaning or interpretation that may not be explicitly contradictory but convey different implications. For example, if one output describes an approach as "promising but unproven" while another describes it as "established and reliable," this represents a semantic conflict in how the approach is characterized.

The system can implement comprehensive validation rules that verify the integrity and consistency of model outputs before aggregation. These domain-specific validation rules operate at multiple levels to ensure response quality. At the formal level, validation rules check for structural correctness, ensuring that outputs conform to expected formats and contain all required components. For example, in financial domains, validation rules verify that numerical values fall within realistic ranges, with rules that flag P/E ratios above 200 or below 0 as potentially erroneous. In healthcare domains, validation rules check medication dosage recommendations against established safety parameters, flagging outputs that exceed maximum recommended doses. Consistency validation rules examine relationships between different data points within a single response, ensuring internal coherence. For instance, in legal domains, validation rules verify that cited regulations are consistent with the jurisdictions mentioned in the query, while in engineering domains, they confirm that material property values are physically possible and mutually compatible. Cross-model validation rules compare outputs from different models to identify potential conflicts, using domain-specific knowledge to determine when differences represent actual contradictions versus complementary perspectives. These validation mechanisms incorporate domain-specific logic constraints that enforce field-specific rules, such as financial accounting principles, physical laws in engineering domains, or clinical guidelines in healthcare contexts. By applying these multi-layered validation rules, the system can identify and address potential issues before presenting information to users, ensuring that the final aggregated output maintains high standards of accuracy and reliability across diverse specialized domains.

In some implementations, the system extracts, from the query, context relating to both the user and a query session involving the user, the context including historical interaction data and relevant system parameters. For example, the system can analyze previous queries from the same user to understand their knowledge level, preferences, and interests. The system can also consider session-specific information such as the sequence of queries in the current interaction and how they relate to each other. For instance, if a user has been asking a series of increasingly detailed questions about a specific medical condition, the system can recognize this progression and provide more specialized information in response to later queries. The plurality of conflict resolution rules is based on the context relating to both the user and the query session involving the user. For instance, if historical interaction data indicates that the user is a technical expert in a particular field, conflict resolution rules can prioritize more technical and detailed responses over simplified explanations. Similarly, if the session context shows that the user has been exploring a specific topic through multiple related queries, the conflict resolution rules can prioritize consistency with previous responses provided in the same session. This context-aware approach to conflict resolution enables the system to provide more personalized and coherent responses that align with the user's specific needs and expectations.

The system generates an aggregated output by combining the set of outputs according to (i) a weighted aggregation algorithm that prioritizes outputs with higher confidence scores and (ii) a plurality of conflict resolution rules. In some implementations, the aggregated output resolves the conflict between the two outputs. The weighted aggregation algorithm combines the various specialized model outputs into a coherent response, giving more influence to outputs with higher confidence scores. This approach ensures that more reliable information has greater weight in the final response. For example, if a specialized medical model provides information about treatment options with a 90% confidence score, while a general knowledge model provides contradictory information with a 60% confidence score, the medical model's output can receive greater weight in the aggregated response. In some implementations, the weighted aggregation algorithm can employ ensemble techniques such as weighted voting or consensus methods to combine multiple responses. The conflict resolution rules provide structured approaches for handling discrepancies between outputs. These rules can include domain precedence rules (outputs from domain-specific models take precedence in their areas of expertise), recency rules (more recent information takes precedence over older information), specificity rules (more specific information takes precedence over general information), and consensus rules (information supported by multiple models takes precedence over information from a single model). The aggregated output presents a unified, coherent response that resolves identified conflicts using these weighted aggregation and conflict resolution approaches.

In some implementations, the system classifies one or more intents associated with the query by using a trained intent classification model to detect both a primary intent and at least one secondary intent within the query. For example, the intent classification model can analyze the query to determine what the user is trying to accomplish, such as seeking information, requesting a calculation, asking for a comparison, or seeking a recommendation. The primary intent represents the main purpose of the query, while secondary intents represent additional goals or requirements.

For instance, in a query like "What are the side effects of medication X and how do they compare to medication Y?" the primary intent can be information retrieval about side effects, while a secondary intent can be comparison between medications. The trained intent classification model assigns a confidence score to each detected intent. These confidence scores indicate how certain the model is about each identified intent, allowing the system to prioritize more clearly expressed intents over those that are more ambiguous. The aggregated output is based at least in part on the one or more intents. For instance, if the primary intent is identified as seeking a recommendation with high confidence, the aggregation process can emphasize recommendation-oriented content from the specialized models and structure the response to clearly present the recommended options. Similarly, if a secondary intent for detailed technical information is detected, the aggregated output can include this information in a supporting section after addressing the primary intent.

The system causes display of the aggregated output in response to the query. Displaying the aggregated output involves presenting the unified response to the user through an appropriate interface. This can include rendering the response as text in a chat interface, generating a structured document with sections corresponding to different aspects of the query, creating visual elements such as charts or diagrams to supplement textual information, or converting the response to speech for voice-based interfaces. The display can be formatted according to user preferences, device capabilities, and the nature of the information being presented. For example, numerical data can be presented in tables or charts, while explanatory information can be presented as formatted text with appropriate headings and emphasis. In some implementations, the system can adapt the presentation format based on the device being used, providing more concise responses for mobile devices and more detailed responses with visual elements for desktop interfaces. The system can also include confidence indicators or source attributions in the displayed output to provide transparency about the reliability of different information components.

Figure 6:
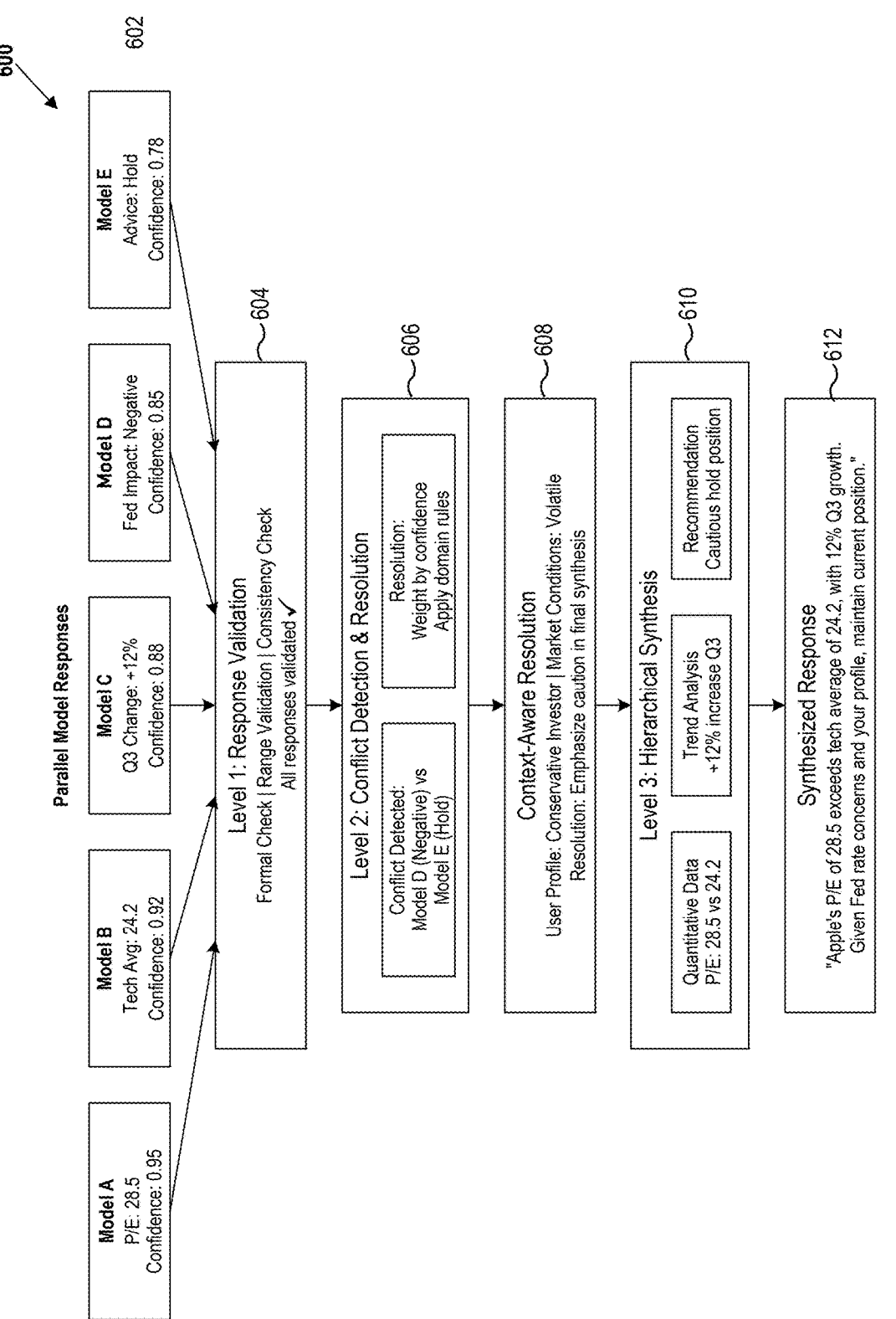
FIG. 6 illustrates a hierarchical aggregation system with conflict resolution, according to some implementations to the disclosed technology.

FIG. 6 illustrates a hierarchical aggregation system 600 with conflict resolution (for example, hierarchical aggregation system 114 of FIG. 1), according to some implementations to the disclosed technology. The hierarchical aggregation system 600 implements a weighted aggregation algorithm that prioritizes outputs with higher confidence scores and applies conflict resolution rules through a sophisticated multi-stage process. The system begins by receiving outputs from parallel models 602 (Models A through E), each with distinct confidence scores and response characteristics that represent the set of outputs generated for the set of sub-queries. For example, Model A can provide technical specifications with a confidence score of 0.95, while Model B provides industry standards with a confidence score of 0.92. These parallel outputs undergo response validation 604, which performs formal checks, range validation, and consistency verification to ensure data integrity before aggregation. The conflict detection and resolution component 606 detects conflicts among the set of outputs by identifying logical, factual, and semantic discrepancies between model outputs, such as contradictory recommendations between different models. This component applies resolution techniques including confidence-weighted analysis and domain-specific rules to resolve these conflicts, directly supporting the capability to resolve conflicts between outputs. For instance, if one model recommends upgrading a device while another suggests waiting, the system can resolve this conflict based on confidence scores and other contextual factors.

The context-aware resolution component 608 incorporates user profile information and environmental conditions into the resolution process, implementing functionality where conflict resolution rules are based on the context relating to both the user and the query session. For example, if the user profile indicates they are a technical professional who prioritizes performance over cost, the system can resolve conflicts in favor of high-performance recommendations. The hierarchical synthesis component 610 organizes information into a coherent structure that preserves specialized insights from domain-specific models while maintaining semantic coherence. In some implementations, this component can structure the response to present factual information first, followed by analysis, and concluding with recommendations, creating a logical flow that guides the user through increasingly complex information. The final synthesized response 612 represents the aggregated output that combines quantitative metrics, trend analysis, and recommendations while resolving conflicts through the weighted aggregation algorithm and conflict resolution rules, ready for display to the user in response to the original query. This hierarchical approach ensures that the final response maintains both technical accuracy and narrative coherence, providing a comprehensive answer that addresses all aspects of the original complex query.

In some implementations, the hierarchical aggregation system employs a multi-level conflict resolution approach. At the first level, confidence-based resolution weights responses by their assigned confidence scores and applies threshold-based selection to filter out low-confidence outputs. At the second level, context-aware resolution considers the query context and user intent to apply domain-specific rules for disambiguation. For example, if a medical query has both diagnostic and treatment aspects, the system can prioritize safety considerations in treatment recommendations when conflicts arise. At the third level, ensemble resolution techniques combine multiple responses using weighted voting or other aggregation methods while applying logical constraints to ensure consistency. This multi-level approach enables the system to handle complex conflicts that cannot be resolved through simple confidence scoring alone.

The system can implement a synthesis engine that constructs coherent, unified responses while maintaining semantic flow and logical consistency. This engine can preserve critical domain-specific insights from specialized models while integrating them into a cohesive narrative structure. For example, when synthesizing information about a medical condition, the synthesis engine can organize information into sections covering symptoms, diagnostic approaches, treatment options, and prognosis, even if this information came from different specialized models. The engine can apply natural language generation techniques to create smooth transitions between different components of the response, ensuring that the final output reads as a unified whole rather than a collection of disconnected facts. This approach enables the system to provide comprehensive responses to complex queries that maintain both technical accuracy and narrative coherence.

In some implementations, the system can cause the routing model to update based on the detected conflict to minimize future conflicts among sets of outputs generated by the routing model. The system can analyze the nature and frequency of conflicts that occur during the aggregation process to identify patterns in routing decisions that lead to contradictory outputs. For example, if the system consistently detects conflicts between outputs from two specific specialized models when processing queries about a particular domain, the routing model can be updated to avoid routing related sub-queries to these models simultaneously. The routing model update process can involve adjusting routing weights, modifying decision thresholds, or implementing new routing rules that consider conflict history when making future routing decisions. In some cases, the system can maintain a conflict history database that tracks which model combinations tend to produce conflicting outputs for specific query types, enabling the routing model to learn from past conflicts and make more informed routing decisions.

The routing model update mechanism can employ machine learning techniques to continuously improve routing strategies based on conflict feedback. The system can implement reinforcement learning approaches where routing decisions that result in fewer conflicts receive positive reinforcement, while decisions that lead to conflicts receive negative feedback. This feedback loop enables the routing model to gradually optimize its routing strategies to minimize the likelihood of future conflicts. In some implementations, the system can also update the routing model by incorporating conflict resolution outcomes into the training data, allowing the model to learn which types of conflicts are more easily resolvable and which should be avoided through better initial routing decisions. The updated routing model can then apply these learned patterns to future queries, potentially reducing the computational overhead associated with conflict detection and resolution by preventing conflicts from occurring in the first place.

Other Implementations:

The disclosed system (hereinafter "data generation platform") herein enables dynamic model selection for processing inputs to generate associated outputs across distributed data sources. The data generation platform uses a generalized model to partition query requests into segments and route the segments to domain-specific models that are specialized for particular domains through training on domain-specific data. The domain-specific models generate query fragments by comparing performance metrics and system resource usage metrics. The query fragments can be aggregated into an overall query that satisfies guidelines across the domains. The data generation platform can, in some implementations, maintain a feedback loop that adjusts domain-specific models based on user interactions and performance metrics. When processing queries, the data generation platform measures performance metrics including compound values based on factors such as compliance, computation speed, resource usage, number of tokens, and accuracy. The data generation platform can consider specific user features learned over time, such as explicit user requests, inferred autonomy preferences, and skill level. Thus, the data generation platform is enabled to dynamically adapt to different users' needs, reducing intervention for experienced users while providing additional support and automated workflows for less experienced users. Additionally, the data generation platform can provide context-specific recommendations based on detected user focus areas, such as suggesting related queries when users consistently work with particular types of data.

Further, users or services of pre-existing software development systems (e.g., data pipelines for data processing and model or application development) do not have intuitive, consistent, or reliable ways to select particular models (e.g., domain-specific models) and/or design associated prompts in order to solve a given problem (e.g., to generate a desired query associated with a particular software application). As such, pre-existing systems risk selection of sub-optimal (e.g., relatively inefficient and/or insecure) generative machine learning models. Moreover, pre-existing development pipelines do not validate outputs of the models for security breaches in a context-dependent and flexible manner. Code generated through a model can contain an error or a bug that can cause system instability (e.g., through loading the incorrect dependencies). Some generated outputs can be misleading or unreliable (e.g., due to model hallucinations or obsolete training data). Additionally or alternatively, some generated data (e.g., associated with natural language text) is not associated with the same severity of security risks.

The data generation platform disclosed herein further enables dynamic evaluation of machine learning prompts for model selection, as well as validation of the resulting outputs, in order to improve the security, reliability, and modularity of data pipelines (e.g., software development systems). The data generation platform can receive a prompt from a user (e.g., a human-readable request relating to software development, such as code generation) and determine whether the user is authenticated based on an associated authentication token (e.g., as provided concurrently with the prompt). Based on the selected model, the data generation platform can determine a set of performance metrics (and/or corresponding values) associated with processing the requested prompt via the selected model. By doing so, the data generation platform can evaluate the suitability of the selected model (e.g., LLM) for generating an output based on the received input or prompt. The data generation platform can validate and/or modify the user's prompt according to a prompt validation model.

The selected model(s) (e.g., domain-specific models) encounter further challenges as AI applications increasingly adopt AI agentic frameworks. AI agentic frameworks enable computing (e.g., software, software and hardware, and so forth) agents to operate autonomously, making decisions and performing actions based on their programming, learned behavior, or suggestions from AI models, or a combination of all three. While AI agentic frameworks offer substantial benefits in automating complex tasks, one major concern is the potential for agents to become rogue and make unauthorized or harmful decisions autonomously. The potential high risk associated with particular applications, databases, and systems creates significant challenges in managing agentic frameworks because the components often handle sensitive data. Conventional approaches to controlling rogue agent actions are predominantly reactive, often addressing issues only after they have occurred, which can be too late to prevent significant damage.

As such, the data generation platform disclosed herein further continuously monitors and evaluates the actions of autonomous agents (e.g., domain-specific models) in near real time. The disclosed system receives a set of alphanumeric characters (e.g., boundaries, regulations, guidelines, and so forth) defining constraints and operational data for a set of agents. Each agent (AI-based or not AI-based) uses predefined objectives to generate proposed actions. The system can identify gaps, or deficiencies in the agent's proposed actions, by comparing expected actions with proposed actions. AI model(s) (same or different) can use the identified gaps to modify the proposed actions by adding, altering, or removing actions.

Non-compliance of AI applications is further complicated as guidelines (e.g., regulations, standards) increasingly become more complex (e.g., protections against bias, harmful language, intellectual property (IP) rights). For example, guidelines can include requirements that require AI applications to produce outputs that are free from bias, harmful language, and/or IP rights violations to uphold ethical standards and protect users. Traditional approaches to regulatory compliance often involve manual interpretation of regulatory texts, followed by ad hoc efforts to align AI systems with compliance requirements. However, the manual process is subjective, lacks scalability, and is error-prone, which makes the approach increasingly unsustainable in the face of growing guidelines and the rapidly increasing prevalence of AI applications.

As such, the data generation platform disclosed herein further assesses and ensures adherence to guidelines (e.g., preventing bias, harmful language, IP violations). The data generation platform uses a meta-model that consists of one or more models to analyze different aspects of AI-generated content. For example, one of the models can be trained to identify certain patterns (e.g., patterns indicative of bias) within the content by evaluating demographic attributes and characteristics present in the content. In some implementations, the system can incorporate a correction module to adjust the parameters of the AI model and/or updates training data based on the findings of the detection models to ensure that non-compliant content is promptly addressed and mitigated.

In cases where non-compliance is detected, conventional approaches to mapping gaps (e.g., issues) in controls (e.g., a set of expected actions) to operative standards (e.g., obligations, criteria, measures, principles, conditions) heavily rely on manually mapping each gap to one or more operative standards. Using manual processes heavily depends on individual knowledge and thus poses a significant risk for potential bias. This subjectivity can result in inconsistent mappings, as different individuals may understand and apply operative standards such as regulatory requirements in varied ways.

As such, the data generation platform disclosed herein further uses generative AI (e.g., GAI, GenAI, generative artificial intelligence) models, such as an LLM in the above-described data generation platform, to map gaps in controls to corresponding operative standards. The data generation platform can determine a set of vector representations of alphanumeric characters represented by one or more operative standards, which contain a first set of actions adhering to constraints in the set of vector representations. The data generation platform uses a received output generation request to construct a set of prompts for each gap to compare the corresponding gap against the first set of actions of the operative standards or the set of vector representations. For each gap, the system maps the gap to one or more operative standards of the set of vector representations.

Further, in cases where non-compliance is detected, conventional approaches to identifying actionable items from guidelines present several challenges. Typically, conventional methods include either human reviewers or automated systems processing guidelines in a linear fashion. The conventional linear approach often leads to an overwhelming number of actionable items being identified. Furthermore, conventional approaches lack the ability to dynamically adapt to changes in guidelines over time.

As such, the data generation platform disclosed herein further identifies actionable items from guidelines. The data generation platform partitions guidelines into multiple subsets based on predetermined criteria, such as the length or complexity of each text subset. Using the partitioned guidelines, the data generation platform constructs a set of prompts for each text subset. Each text subset can be mapped to one or more actions in the first set of actions. Unlike conventional linear processes that result in an overwhelming number of redundant actionable items, by heuristically analyzing guidelines, the system can identify common actionable items without parsing through the guideline documents word by word.

While the current description provides examples related to LLMs, one of skill in the art would understand that the disclosed techniques can apply to other forms of machine learning or algorithms, including unsupervised, semi-supervised, supervised, and reinforcement learning techniques. For example, the disclosed data generation platform can evaluate model outputs from support vector machine (SVM), k-nearest neighbor (KNN), decision-making, linear regression, random forest, naïve Bayes, or logistic regression algorithms, and/or other suitable computational models.

Overview of the Data Generation Platform

Figure 7:
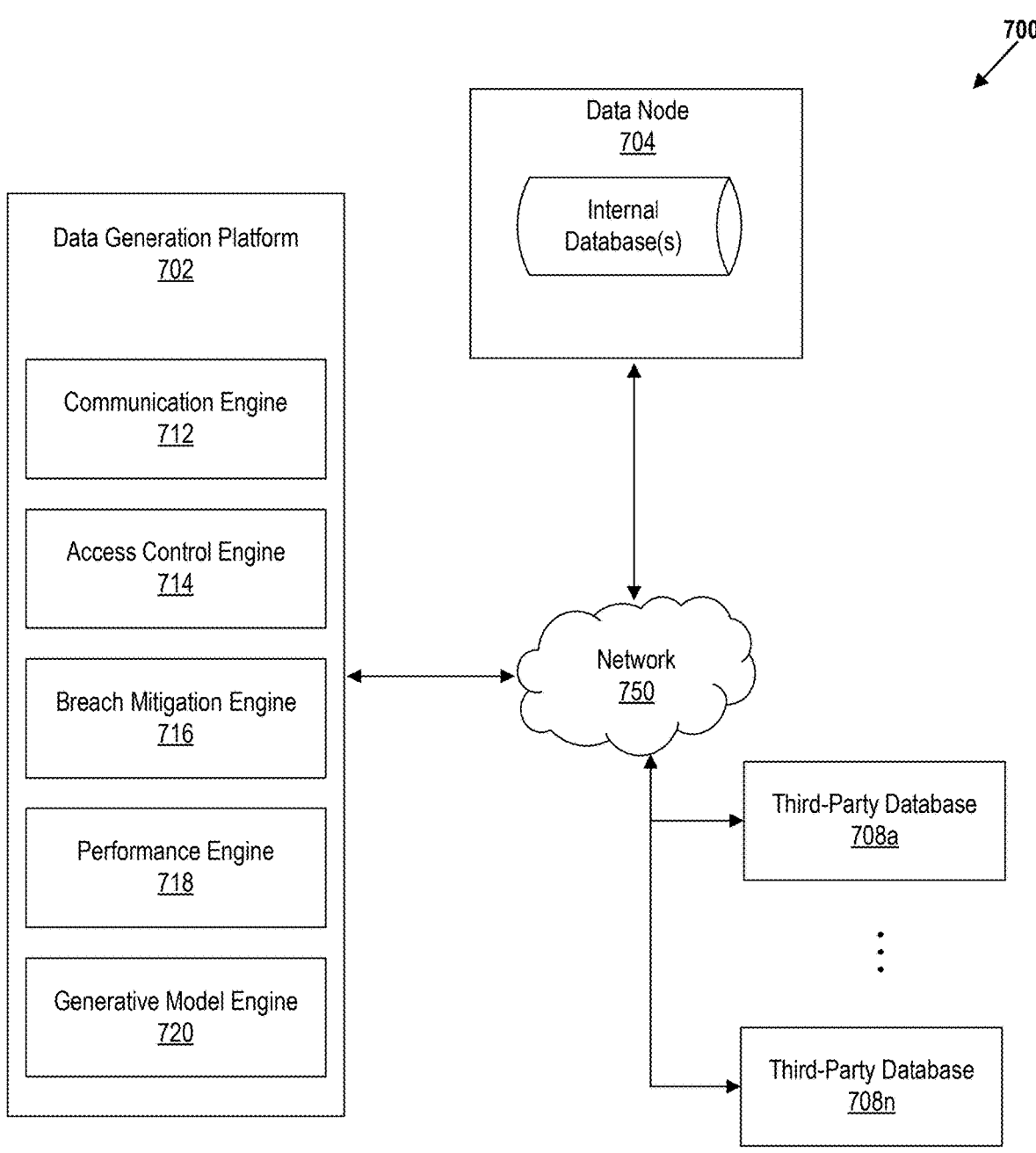
FIG. 7 shows an illustrative environment for evaluating language model prompts and outputs for model selection and validation, according to some implementations to the disclosed technology.

FIG. 7 shows an illustrative environment 700 for evaluating machine learning model inputs (e.g., language model prompts) and outputs for model selection and validation, according to some implementations to the disclosed technology. For example, the environment 700 includes the data generation platform 702, which is capable of communicating with (e.g., transmitting or receiving data to or from) a data node 704 and/or third-party databases 708a-708n via a network 750. The data generation platform 702 can include software, hardware, or a combination of both and can reside on a physical server or a virtual server running on a physical computer system. For example, the data generation platform 702 can be distributed across various nodes, devices, or virtual machines (e.g., as in a distributed cloud server). In some implementations, the data generation platform 702 can be configured on a user device (e.g., a laptop computer, smartphone, desktop computer, electronic tablet, or another suitable user device). Furthermore, the data generation platform 702 can reside on a server or node and/or can interface with third-party databases 708a-708n directly or indirectly.

The data node 704 can store various data, including one or more machine learning models, prompt validation models, associated training data, user data, performance metrics and corresponding values, validation criteria, and/or other suitable data. For example, the data node 704 includes one or more databases, such as an event database (e.g., a database for storage of records, logs, or other information associated with LLM-related user actions), a vector database, an authentication database (e.g., storing authentication tokens associated with users of the data generation platform 702), a secret database, a sensitive token database, and/or a deployment database.

An event database can include data associated with events relating to the data generation platform 702. For example, the event database stores records associated with users' inputs or prompts for generation of an associated natural language output (e.g., prompts intended for processing using an LLM). The event database can store timestamps and the associated user requests or prompts. In some implementations, the event database can receive records from the data generation platform 702 that include model selections/determinations, prompt validation information, user authentication information, and/or other suitable information. For example, the event database stores platform-level metrics (e.g., bandwidth data, central processing unit (CPU) usage metrics, and/or memory usage associated with devices or servers associated with the data generation platform 702). By doing so, the data generation platform 702 can store and track information relating to performance, errors, and troubleshooting. The data generation platform 702 can include one or more subsystems or subcomponents. For example, the data generation platform 702 includes a communication engine 712, an access control engine 714, a breach mitigation engine 716, a performance engine 718, and/or a generative model engine 720.

A vector database can include data associated with vector embeddings of data. For example, the vector database includes a numerical representations (e.g., arrays of values) that represent the semantic meaning of unstructured data (e.g., text data, audio data, or other similar data). For example, the data generation platform 702 receives inputs such as unstructured data, including text data, such as a prompt, and utilize a vector encoding model (e.g., with a transformer or neural network architecture) to generate vectors within a vector space that represents meaning of data objects (e.g., of words within a document). By storing information within a vector database, the data generation platform 702 can represent inputs, outputs, and other data in a processable format (e.g., with an associated LLM), thereby improving the efficiency and accuracy of data processing.

An authentication database can include data associated with user or device authentication. For example, the authentication database includes stored tokens associated with registered users or devices of the data generation platform 702 or associated development pipeline. For example, the authentication database stores keys (e.g., public keys that match private keys linked to users and/or devices). The authentication database can include other user or device information (e.g., user identifiers, such as usernames, or device identifiers, such as medium access control (MAC) addresses). In some implementations, the authentication database can include user information and/or restrictions associated with these users.

A sensitive token (e.g., secret) database can include data associated with secret or otherwise sensitive information. For example, secrets can include sensitive information, such as application programming interface (API) keys, passwords, credentials, or other such information. For example, sensitive information includes personally identifiable information (PII), such as names, identification numbers, or biometric information. By storing secrets or other sensitive information, the data generation platform 702 can evaluate prompts and/or outputs to prevent breaches or leakage of such sensitive information.

A deployment database can include data associated with deploying, using, or viewing results associated with the data generation platform 702. For example, the deployment database can include a server system (e.g., physical or virtual) that stores validated outputs or results from one or more LLMs, where such results can be accessed by the requesting user.

The data generation platform 702 can receive inputs (e.g., prompts), training data, validation criteria, and/or other suitable data from one or more devices, servers, or systems. The data generation platform 702 can receive such data using communication engine 712, which can include software components, hardware components, or a combination of both. For example, the communication engine 712 includes or interfaces with a network card (e.g., a wireless network card and/or a wired network card) that is associated with software to drive the card and enables communication with network 750. In some implementations, the communication engine 712 can also receive data from and/or communicate with the data node 704, or another computing device. The communication engine 712 can communicate with the access control engine 714, the breach mitigation engine 716, the performance engine 718, and the generative model engine 720.

In some implementations, the data generation platform 702 can include the access control engine 714. The access control engine 714 can perform tasks relating to user/device authentication, controls, and/or permissions. For example, the access control engine 714 receives credential information, such as authentication tokens associated with a requesting device and/or user. In some implementations, the access control engine 714 can retrieve associated stored credentials (e.g., stored authentication tokens) from an authentication database (e.g., stored within the data node 704). The access control engine 714 can include software components, hardware components, or a combination of both. For example, the access control engine 714 includes one or more hardware components (e.g., processors) that are able to execute operations for authenticating users, devices, or other entities (e.g., services) that request access to an LLM associated with the data generation platform 702. The access control engine 714 can directly or indirectly access data, systems, or nodes associated with the third-party databases 708a-708n and can transmit data to such nodes. Additionally or alternatively, the access control engine 714 can receive data from and/or send data to the communication engine 712, the breach mitigation engine 716, the performance engine 718, and/or the generative model engine 720.

The breach mitigation engine 716 can execute tasks relating to the validation of inputs and outputs associated with the LLMs. For example, the breach mitigation engine 716 validates inputs (e.g., prompts) to prevent sensitive information leakage or malicious manipulation of LLMs, as well as validate the security or safety of the resulting outputs. The breach mitigation engine 716 can include software components (e.g., modules/virtual machines that include prompt validation models, performance criteria, and/or other suitable data or processes), hardware components, or a combination of both. As an illustrative example, the breach mitigation engine 716 monitors prompts for the inclusion of sensitive information (e.g., PII), or other forbidden text, to prevent leakage of information from the data generation platform 702 to entities associated with the target LLMs. The breach mitigation engine 716 can communicate with the communication engine 712, the access control engine 714, the performance engine 718, the generative model engine 720, and/or other components associated with the network 750 (e.g., the data node 704 and/or the third-party databases 708a-708n).

The performance engine 718 can execute tasks relating to monitoring and controlling performance of the data generation platform 702 (e.g., or the associated development pipeline). For example, the performance engine 718 includes software components (e.g., performance monitoring modules), hardware components, or a combination thereof. To illustrate, the performance engine 718 can estimate performance metric values associated with processing a given prompt with a selected LLM (e.g., an estimated cost or memory usage). By doing so, the performance engine 718 can determine whether to allow access to a given LLM by a user, based on the user's requested output and the associated estimated system effects. The performance engine 718 can communicate with the communication engine 712, the access control engine 714, the performance engine 718, the generative model engine 720, and/or other components associated with the network 750 (e.g., the data node 704 and/or the third-party databases 708a-708n).

The generative model engine 720 can execute tasks relating to machine learning inference (e.g., natural language generation based on a generative machine learning model, such as an LLM). The generative model engine 720 can include software components (e.g., one or more LLMs, and/or API calls to devices associated with such LLMs), hardware components, and/or a combination thereof. To illustrate, the generative model engine 720 can provide users' prompts to a requested, selected, or determined model (e.g., LLM) to generate a resulting output (e.g., to a user's query within the prompt). As such, the generative model engine 720 enables flexible, configurable generation of data (e.g., text, code, or other suitable information) based on user input, thereby improving the flexibility of software development or other such tasks. The generative model engine 720 can communicate with the communication engine 712, the access control engine 714, the performance engine 718, the generative model engine 720, and/or other components associated with the network 750 (e.g., the data node 704 and/or the third-party databases 708a-708n).

Engines, subsystems, or other components of the data generation platform 702 are illustrative. As such, operations, subcomponents, or other aspects of particular subsystems of the data generation platform 702 can be distributed, varied, or modified across other engines. In some implementations, particular engines can be deprecated, added, or removed. For example, operations associated with breach mitigation are performed at the performance engine 718 instead of at the breach mitigation engine 716.

Figure 8:
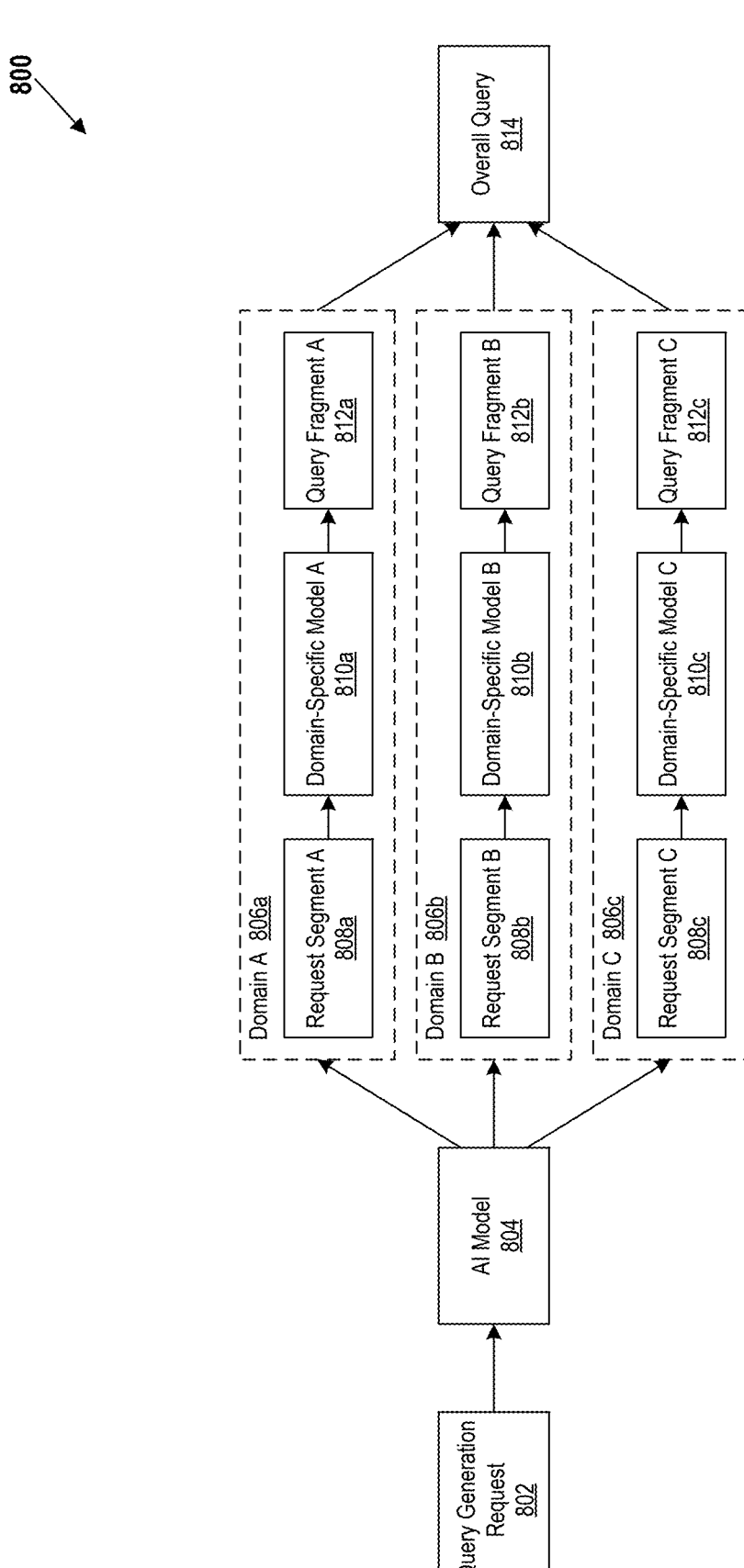
FIG. 8 is a block diagram illustrating an example environment for generating a distributed data query, according to some implementations to the disclosed technology.

Dynamically Selecting Models for Distributed Data Queries Using the Data Generation Platform FIG. 8 is a block diagram illustrating an example environment 800 for generating a distributed data query, according to some implementations to the disclosed technology. The example environment 800 includes a query generation request 802, an AI model 804, domains 806, request segments 808, domain-specific models 810, query fragments 812, and overall query 814. Implementations of example environment 800 can include different and/or additional components or can be connected in different ways. The environment 800 includes a query generation request 802 that is received by an AI model 804. The query generation request 802 can include a structured instruction for generation of an output (e.g., a generated query) using an LLM or other artificial intelligence model (i.e., AI model 804). For example, the query generation request 802 can be a request to retrieve stored information within certain parameters (e.g., a certain time frame, a certain monetary amount, and so forth), such as "Show me all customer transactions over $10,000 from the last quarter." The AI model 804 partitions the query generation request 802 into one or more request segments 808 (such as a first request segment 808a, a second request segment 808b, a third request segment 808c, and so forth) by mapping them to corresponding domains 806 (such as a first domain 806a, a second domain 806b, a third domain 806c, and so forth). The request segments 808 can be portions of the query generation request 802 that share common domain characteristics. For example, if a query includes retrieving both financial data and customer information, the data generation platform 702 can be segmented into separate components-one segment for the financial domain and another for the customer data domain.

A domain 806 can indicate a specific data context, such as different departments or areas within an organization, and each can have their own specialized data requirements and compliance rules. For example, domains 806 can include areas like compliance, finance, and customer data management. Each domain can maintain its own set of databases containing structured and/or unstructured data and operate under specific guidelines (e.g., regulatory requirements, operational constraints, data governance policies) that govern data access and/or processing within that domain. For each domain, there can be a corresponding domain-specific model (such as a first domain-specific model 810a, a second domain-specific model 810b, a third domain-specific model 810c, and so forth).

A domain-specific model 810 can be a specialized model that has been trained using domain-specific data and can be optimized to process queries within its particular domain. Domain-specific models 810 can include small language models and/or specialized language models that are trained on domain-specific data such as compliance requirements, financial data, customer information, and so forth. Each domain-specific model generates query fragments 812 (such as a first query fragment 812a, a second query fragment 812b, a third query fragment 812c, and so forth) for its respective domain.

Each domain-specific model 810 can be a single model or a suite of models. For example, within each domain-specific model 810, there can be a set of further specialized models tailored to handle specific tasks or data types. For instance, in the banking sector, specialized models can include particular models trained on different subsets of banking data and optimized for different functions (e.g., fraud detection). The specialized models can work together in an end-to-end workflow, where the output of one model serves as the input for the next. Alternatively, a domain-specific model 810 can include a group of models that operate via majority decision and/or average, where multiple models evaluate the same data, and their outputs are aggregated to determine the final result of the domain-specific model 810. For example, in a risk assessment domain, several models (same or different) can independently evaluate the risk of a transaction, and the final risk score can be determined based on the majority decision or average of these models.

Query fragments 812 can include software-related information configured to operate as input in database management systems to retrieve domain-specific data in accordance with domain-specific guidelines. The AI model 804 can aggregate the individual query fragments 812 into an overall query 814. The overall query 814 can satisfy the guidelines associated with each database across all domains while maintaining compliance with regulatory and organizational standards.

For example, if a query generation request 802 includes instructions to query customer transaction data across multiple departments, such as "show me all customer transactions over $10,000 from the last quarter with associated risk scores," the AI model 804 can partition the request 802 into three distinct segments: one for the banking domain 806a (to access transaction data), one for the risk assessment domain 806b (to retrieve risk scores), and one for the compliance domain 806c (to ensure regulatory requirements are met). Each domain's specialized model can then individually and separately process the segment. For example, the banking domain-specific model 810a can generate a query fragment 812a to retrieve the transaction records, the risk assessment domain-specific model 810b can generate a fragment 812b to calculate risk scores, and the compliance domain-specific model 810c can generate a fragment 812c to validate regulatory requirements like anti-money laundering checks. The AI model 804 can combine the fragments into an overall query 814 that retrieves the complete dataset specified by the query generation request 802 while efficiently using system resources and maintaining compliance with each domain's guidelines.

Figure 9:
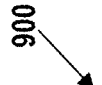
FIG. 9 is a block diagram illustrating an example environment of a domain-specific model used for distributed data queries, according to some implementations to the disclosed technology.

FIG. 9 is a block diagram illustrating an example environment 900 of a domain-specific model 904 (e.g., domain-specific models 810) used for distributed data queries, according to some implementations to the disclosed technology. The example environment 900 includes a request segment 902, the domain-specific model 904, candidate query fragments 906, estimated metrics 908, domain-specific training data 910, domain-specific guidelines 912, and selected query fragment 914. Implementations of example environment 900 can include different and/or additional components or can be connected in different ways.

The request segment 902 (e.g., the first request segment 808a, the second request segment 808b, the third request segment 808c) can be transmitted to its respective domain-specific model 904 through a synchronous communication channel. The domain-specific model 904 can be trained using domain-specific training data 910. Domain-specific training data 910 can include data within the domain of the domain-specific model 904. Domain-specific model 904 can include models such as credit scoring models, fraud detection algorithms, risk assessment systems, and so forth. The training data enables the domain-specific model 904 to learn patterns and characteristics associated with compliant and non-compliant behavior within its specific domain. For example, a particular domain-specific model can learn that specific queried information must be anonymized prior to presenting the retrieved information to the user.

Upon receiving a request segment 902, the domain-specific model 904 generates one or more candidate query fragments 906 (shown as candidate query fragment A 906a and candidate query fragment B 906b). Each candidate query fragment can include software-related information configured to operate as input in database management systems to retrieve domain-specific data. For each candidate query fragment, the domain-specific model 904 can calculate estimated metrics 908 (shown as estimated metrics A 908a and estimated metrics B 908b). The estimated metrics can include, for example, compliance measurements against domain-specific guidelines 912, computation speed for query execution, token usage for processing requirements, resource usage for data retrieval, and so forth.

Domain-specific guidelines 912 can include regulatory requirements and operational constraints that govern data access and processing within the specific domain. The guidelines establish the rules, procedures, and/or standards that are followed when handling data within that domain's context. Domain-specific guidelines 912 can include, for example, data privacy requirements, access controls, encryption standards, breach notification protocols, data retention policies, authentication procedures, audit requirements, user permission protocols, cybersecurity measures, data governance policies, compliance validation criteria, risk management procedures, transparency requirements, human oversight protocols, and so forth. The guidelines can be derived from external regulatory sources and/or internal organizational policies, serving as benchmarks against which compliance of the query is measured and validated.

Based on the estimated metrics 908 and compliance with domain-specific guidelines 912, the domain-specific model 904 can select a query fragment 914 from the candidate query fragments 906. For example, when processing a financial data query, the domain-specific model 904 can generate multiple candidate query fragments 906 with different approaches to accessing and joining financial tables. The domain-specific model 904 can evaluate each candidate's estimated resource usage, processing speed, and compliance with financial regulations before selecting the selected query fragment 914 that balances performance with regulatory requirements.

FIG. 10A is a flow diagram illustrating an example process of query decomposition and parallel routing, according to some implementations to the disclosed technology. In some implementations, process 1000 is performed by a system including components of the example environment 700 illustrated and described in more detail with reference to FIG. 7. The system can be implemented on a terminal device, on a server, or on a telecommunications network core. Implementations can include different and/or additional operations or can perform the operations in different orders.

In operation 1002, the data generation platform 702 can receive, from a user, a query (e.g., complex query in FIG. 1) comprising a request relating to a particular domain. For example, the query can be a complex question that contains multiple distinct components requiring different types of expertise. The data generation platform 702 can receive the query through various interfaces including web applications, mobile applications, voice assistants, or application programming interfaces (APIs). The particular domain can include technical fields such as healthcare, legal, scientific research, engineering, or other specialized areas that require domain-specific knowledge. For instance, a query in the healthcare domain can ask about treatment options, medication interactions, and success rates for a specific condition, while a query in the engineering domain can request structural analysis, material properties, and regulatory compliance information for a construction project.

In operation 1004, the data generation platform 702 can determine, based on the query, a set of sub-queries using a decomposition model (e.g., query decomposition engine 106 in FIG. 1) trained to determine sub-queries. The decomposition model can be trained to determine sub-queries based on one or more of semantic boundaries, syntactics, tasks, relationships, and rules relating to particular domains. The decomposition model can be a machine learning model specifically trained to identify distinct components within complex queries. This model can analyze the query structure to recognize where one logical unit ends and another begins. For example, when processing a query about "treatment options for diabetes, their success rates, and potential side effects," the decomposition model can identify three distinct sub-queries: one about treatment options, another about success rates, and a third about side effects.

In operation 1006, the data generation platform 702 can input the set of sub-queries into a routing model (e.g., routing intelligence system 108 in FIG. 1) to determine a set of specialized models for the set of sub-queries, wherein the routing model is trained to assign sub-queries for input into a set of specialized models according to one or more routing strategies. The routing model can be a machine learning system that analyzes each sub-query and determines which specialized model would be most appropriate for processing it. This model considers various factors when making routing decisions, including the nature of the sub-query, the capabilities of available specialized models, computational efficiency considerations, and historical performance data. In some implementations, the routing model implements a multi-strategy approach that considers performance metrics, cost optimization, domain expertise, and adaptive learning simultaneously. The specialized models can include domain-specific language models fine-tuned on particular datasets, numerical calculation models, data retrieval systems, analytical models, and other purpose-built processing systems.

In operation 1008, the data generation platform 702 can route (e.g., using parallel execution engine 110 in FIG. 1) each sub-query to a respective specialized model in the set of specialized models. For example, the data generation platform 702 can route a sub-query about treatment options to a pharmaceutical knowledge model, while a sub-query about success rates can be routed to a specialized statistical analysis model. In operation 1010, the data generation platform 702 can input each sub-query into the respective specialized model (e.g., specialized models 112 in FIG. 1) to generate an output.

In operation 1012, the data generation platform 702 can assign, to each respective output, a confidence score (e.g., using hierarchical aggregation system 114 in FIG. 1). The confidence score represents the system's assessment of how reliable the output is likely to be, considering multiple factors. The data generation platform 702 can determine the reliability of the specialized model based on historical performance metrics, validation testing results, and model maturity. Models with consistently accurate outputs receive higher confidence ratings. The complexity of the sub-query affects confidence scoring because more complex queries typically have higher uncertainty. For example, a simple factual sub-query can receive a higher confidence score than a complex analytical sub-query with multiple variables.

In operation 1014, the data generation platform 702 can generate an aggregated output by combining the set of outputs according to (i) a weighted aggregation algorithm that prioritizes outputs with higher confidence scores and (ii) a plurality of conflict resolution rules (e.g., using hierarchical aggregation system 114 in FIG. 1). The data generation platform 702 combines the various specialized model outputs into a coherent response, giving more influence to outputs with higher confidence scores. This approach ensures that more reliable information has greater weight in the final response. For example, if a specialized medical model provides information about treatment options with a 90% confidence score, while a general knowledge model provides contradictory information with a 60% confidence score, the medical model's output can receive greater weight in the aggregated response. In some implementations, the data generation platform 702 can employ ensemble techniques such as weighted voting or consensus methods to combine multiple responses. The conflict resolution rules provide structured approaches for handling discrepancies between outputs. These rules can include domain precedence rules (outputs from domain-specific models take precedence in their areas of expertise), recency rules (more recent information takes precedence over older information), specificity rules (more specific information takes precedence over general information), and consensus rules (information supported by multiple models takes precedence over information from a single model). The aggregated output presents a unified, coherent response that resolves identified conflicts using these weighted aggregation and conflict resolution approaches.

In operation 1016, the data generation platform 702 can cause display of the aggregated output in response to the query. Displaying the aggregated output can involve presenting the unified response to the user through an appropriate interface. This can include rendering the response as text in a chat interface, generating a structured document with sections corresponding to different aspects of the query, creating visual elements such as charts or diagrams to supplement textual information, or converting the response to speech for voice-based interfaces. The data generation platform 702 can format the display according to user preferences, device capabilities, and the nature of the information being presented.

FIG. 10B is a flow diagram illustrating an example process of dynamically selecting models for distributed data queries, according to some implementations to the disclosed technology. In some implementations, the example process 1050 is performed by a system including components of the example environment 700 illustrated and described in more detail with reference to FIG. 7. The system can be implemented on a terminal device, on a server, or on a telecommunications network core. Implementations can include different and/or additional operations or can perform the operations in different orders.

In operation 1052, the data generation platform 702 can obtain an output generation request (e.g., the query generation request 802 in FIG. 8) including an instruction for generation of an output using an AI model (e.g., an LLM). Examples of output generation requests are discussed in further detail with reference to output generation request 802 in FIG. 8. For instance, an output generation request can be received via a user interface where users input their queries or instructions directly. The interface can be a web-based application, a mobile app, or a command-line interface, and the output generation request can be in natural language or structured query language. The data generation platform 702 can, in some implementations, obtain output generation requests through API calls from other systems or applications. External systems can programmatically send requests to the data generation platform 702. Additionally, output generation requests can be triggered by scheduled tasks or events. For example, the data generation platform 702 can be configured to automatically generate reports or perform data analysis at specific intervals, such as daily, weekly, or monthly. Event-driven requests can be set up, where certain conditions or triggers within the system initiate the generation of an output. For instance, a significant change in market data or a detected anomaly in transaction patterns can prompt the data generation platform 702 to retrieve certain data.

In operation 1054, the data generation platform 702 can partition, using an AI model, the output generation request into one or more segments by associating the output generation request to a set of domains indicating (1) a set of databases and (2) a set of guidelines associated with the set of databases. The components of each segment of the output generation request can share a common domain. The AI model (discussed in further detail with reference to FIG. 8) can include, but is not limited to, LLMs, SVMs, k-nearest neighbor algorithms, decision-making algorithms, linear regression, random forest, naïve Bayes, logistic regression algorithms, or other suitable computational models.

The data generation platform 702 can generate vector representations of the output generation request. The data generation platform 702 can use one or more vector encoding models with transformer architectures, neural network architectures, or other architectures to generate vectors within a vector space representing semantic meaning of request components. The vector representations can be stored in one or more vector databases as numerical arrays capturing semantic relationships.

The data generation platform 702 can map vector representations to domains through one or more techniques, such as vector similarity calculations, pattern recognition across data structures, analysis of data dependencies, evaluation of compliance requirements, assessment of resource patterns, and so forth. For example, K-means or hierarchical clustering can be used to identify patterns and group the data into clusters that represent different domains. Clusters with frequent occurrences of the same terms can be mapped to corresponding domains. Further, the data generation platform 702 can compare vector representations by calculating the cosine of the angle between vectors to determine their directional similarity. For comparing textual elements, the data generation platform 702 can measure the intersection over the union of word sets in the expected (e.g., within a domain) and case-specific (e.g., within the output generation request) representations. The data generation platform 702 can identify specific patterns, keywords, or formats indicative of domain-specific information. In some implementations, the data generation platform 702 can use graph databases to represent relationships between vectors as nodes and edges to model interdependencies between domains.

In operation 1056, the data generation platform 702 can route each of the one or more segments to a set of domain-specific models (e.g., SLMs). Each domain-specific model can share the same domain as corresponding routed segments. Further, each domain-specific model can be trained using training data associated with the domain of the domain-specific model. The data generation platform 702 can transmit each segment to its respective domain-specific model through a synchronous communication channel. The data generation platform 702 can use various communication protocols, such as HTTP, gRPC, or WebSockets to establish this channel, depending on the system architecture and requirements. In some implementations, the data generation platform 702 can use different communication channels depending on different domains. For example, different domains may have different guidelines (e.g., encryption standards).

In operation 1058, the data generation platform 702 can generate, using the set of domain-specific models, a query fragment for each domain-specific model by using (e.g., by comparing) (1) a set of performance metric values associated with using the query fragment to retrieve domain-specific data from the set of databases and/or (2) a set of system resource metric values indicating an estimated usage of system resources (e.g., hardware resources, software resources, network resources, and so forth) to retrieve the domain-specific data using the query fragment. The query fragment can operate as an input in the set of databases to retrieve the domain-specific data in accordance with the set of guidelines of the domain. In some implementations, the data generation platform 702 can generate the query fragment by retrieving the domain-specific data from departmental databases, data lakes, and/or storage systems via, for example, a set of API calls and/or a set of direct database queries. The data generation platform 702 can generate the query fragments by measuring performance metrics including a compound value based on, for example, compliance, computation speed, resource usage, number of tokens, computation speed associated with query execution, resource allocation associated with data retrieval, compliance validation results, and/or accuracy.

Further, the data generation platform 702 can measure specific user features such as explicit user requests, inferred autonomy preferences, and/or skill level. The data generation platform 702 can modify at least one domain-specific model based on the performance metrics and specific user features. For example, the data generation platform 702 can track how users interact with the system, the types of queries they submit, and the complexity of their requests. By observing these interactions, the data generation platform 702 can infer whether a user is highly experienced or relatively new to the system. For more experienced users, the data generation platform 702 can adopt a less intrusive approach, providing them with the flexibility to explore and execute queries independently. These users may prefer minimal guidance and more control over the data retrieval process. The data generation platform 702 can adjust the domain-specific models to offer more customizable options or parameters in the generated query. Conversely, for less experienced users, the data generation platform 702 can take a more supportive role by automatically executing programmatic workflows and/or providing step-by-step guidance. For instance, if a user frequently submits basic queries or requests assistance, the data generation platform 702 can infer that the user may benefit from additional support and can simplify the query process, offer more predefined templates, and/or automate routine tasks.

In operation 1060, the data generation platform 702 can aggregate, using the AI model, the query fragments into an overall query configured to satisfy the set of guidelines associated with each database of the set of domains. To resolve interdependencies between the fragments, the data generation platform 702 can map out the dependencies between the query fragments, identifying which fragments rely on data from other fragments and determining the order in which the fragments should be executed. For example, if a fragment retrieving customer details is required before retrieving transaction data, the data generation platform 702 can ensure that the customer details fragment is executed first. The data generation platform 702 can resolve conflicts that arise during the aggregation process (e.g., when fragments have overlapping data or when there are discrepancies between the data retrieved by different fragments). The data generation platform 702 can use predefined rules and guidelines to address these conflicts. For example, if two fragments retrieve different versions of the same data, the data generation platform 702 can use the most recent version.

The data generation platform 702 can validate that each query fragment adheres to the set of guidelines of the domain (which can be predetermined) before aggregating the query fragments. The data generation platform 702 can perform a set of compliance checks to validate that the overall query satisfies the set of guidelines. In some implementations, the data generation platform 702 can present the overall query to a user via a user interface configured to receive a user input indicating an acceptance or a denial of the overall query. The data generation platform 702 can associate each query fragment with compliance validation data indicating a degree of compliance of the query fragment with the set of guidelines and transmit each query fragment to the AI model through a communication channel. The data generation platform 702 can integrate the query fragments into the overall query based on interdependencies between the query fragments. In some implementations, the data generation platform 702 can detect a set of interdependencies between the query fragments and validate the overall query against the set of interdependencies.

In some implementations, the data generation platform 702 can input, into a computer program, the overall query to receive a set of requested data in accordance with the instruction of the output generation request. For example, the data generation platform 702 can input the overall query into computer programs through API calls to domain-specific services, direct database queries using structured query language (SQL), or interfaces with storage systems using defined protocols.

The data generation platform 702 can obtain a user-requested query. When processing user-requested queries, the platform can establish authority scores by evaluating historical actions, analyzing transaction amounts, and assessing hardware system interactions. Resource differences can be calculated by comparing computation speed, resource allocation requirements, and compliance validation results. The data generation platform 702 can establish a first score quantifying an authority of the user-requested query and establish a second score quantifying resource differences between the user-requested query and the overall query. The data generation platform 702 can select either the overall query or the user-requested query based on the first score and the second score. In some implementations, the data generation platform 702 can detect a set of conflicts between a user request and the overall query associated with a resource usage difference. In some implementations, the data generation platform 702 can automatically execute one or more actions (e.g., programmatic workflows) based on the resource usage difference exceeding a predefined threshold. The data generation platform 702 can notify a validation agent in response to a conflict between a user-requested query and the overall query.

The data generation platform 702 can detect a focus area of a user based on historical queries and generate context-specific recommendations based on the focus area. In some implementations, the data generation platform 702 can detect a set of data patterns across multiple data warehouses and generate a set of query recommendations based on the detected set of data patterns. In some implementations, the data generation platform 702 can automatically execute a set of programmatic workflows based on a degree of user experience. For instance, for a user that generates daily reports, the data generation platform 702 can automate this workflow by scheduling the report generation at the end of each day, automatically retrieving the relevant data, and sending the report to the user's email. This reduces the user's workload and ensures that they receive timely and accurate information without having to manually execute the queries.

Suitable Computing Environments of the Data Generation Platform

Figure 11:
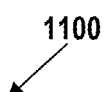
FIG. 11 shows a block diagram showing some of the components typically incorporated in at least some of the computer systems and other devices on which the disclosed system operates, according to some implementations to the disclosed technology.

FIG. 11 shows a block diagram showing some of the components typically incorporated in at least some of the computer systems and other devices 1100 on which the disclosed system (e.g., the data generation platform 702) operates, according to some implementations to the disclosed technology. In various implementations, these computer systems and other device(s) 1100 can include server computer systems, desktop computer systems, laptop computer systems, netbooks, mobile phones, personal digital assistants, televisions, cameras, automobile computers, electronic media players, web services, mobile devices, watches, wearables, glasses, smartphones, tablets, smart displays, virtual reality devices, augmented reality devices, etc. In various implementations, the computer systems and devices include zero or more of each of the following: input components 1104, including keyboards, microphones, image sensors, touch screens, buttons, track pads, mice, compact disc (CD) drives, digital video disc (DVD) drives, 3.5 mm input jack, High-Definition Multimedia Interface (HDMI) input connections, Video Graphics Array (VGA) input connections, Universal Serial Bus (USB) input connections, or other computing input components; output components 1106, including display screens (e.g., liquid crystal displays (LCDs), organic light-emitting diodes (OLEDs), cathode ray tubes (CRTs), etc.), speakers, 3.5 mm output jack, lights, light emitting diodes (LEDs), haptic motors, or other output-related components; processor(s) 1108, including a CPU for executing computer programs, a GPU for executing computer graphic programs and handling computing graphical elements; storage(s) 1110, including at least one computer memory for storing programs (e.g., application(s) 1112, model(s) 1114, and other programs) and data while they are being used, including the facility and associated data, an operating system including a kernel, and device drivers; a network connection component(s) 1116 for the computer system to communicate with other computer systems and to send and/or receive data, such as via the Internet or another network and its networking hardware, such as switches, routers, repeaters, electrical cables and optical fibers, light emitters and receivers, radio transmitters and receivers, and the like; a persistent storage(s) device 1118, such as a hard drive or flash drive for persistently storing programs and data; and computer-readable media drives 1120 (e.g., at least one non-transitory computer-readable medium) that are tangible storage means that do not include a transitory, propagating signal, such as a floppy, CD-ROM, or DVD drive, for reading programs and data stored on a computer-readable medium. While computer systems configured as described above are typically used to support the operation of the facility, those skilled in the art will appreciate that the facility can be implemented using devices of various types and configurations and having various components.

Figure 12:
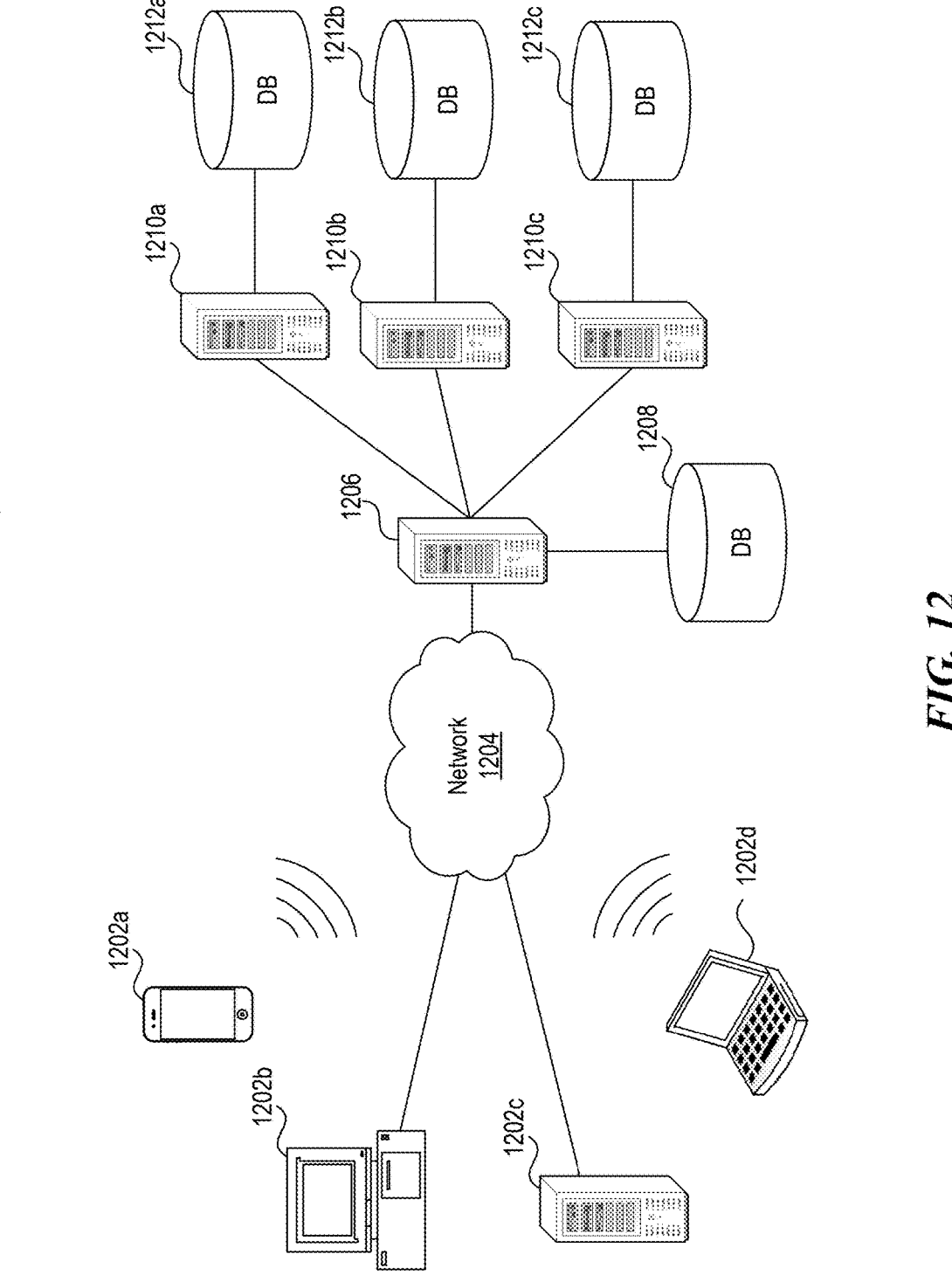
FIG. 12 is a system diagram illustrating an example of a computing environment in which the disclosed system operates, according to some implementations to the disclosed technology.

FIG. 12 is a system diagram illustrating an example of a computing environment 1200 in which the disclosed system operates, according to some implementations to the disclosed technology. In some implementations, environment 1200 includes one or more client computing devices 1202a-1202d, examples of which can host graphical user interfaces associated with client devices. For example, one or more of the client computing devices 1202a-1202d includes user devices and/or devices associated with services requesting responses to queries from LLMs. Client computing devices 1202 operate in a networked environment using logical connections through network 1204 (e.g., the network 150) to one or more remote computers, such as a server computing device (e.g., a server system housing the data generation platform 702 of FIG. 7). In some implementations, client computing devices 1202 can correspond to device 1100 (FIG. 11).

In some implementations, server computing device 1206 is an edge server that receives client requests and coordinates fulfillment of those requests through other servers, such as server computing devices 1210a-1210c. In some implementations, server computing devices 1206 and 1210 include computing systems. Though each server computing device 1206 and 1210 is displayed logically as a single server, server computing devices can each be a distributed computing environment encompassing multiple computing devices located at the same or at geographically disparate physical locations. In some implementations, each server computing device 1210 corresponds to a group of servers.

Client computing devices 1202 and server computing devices 1206 and 1210 can each act as a server or client to other server or client devices. In some implementations, server computing devices (1206, 1210a-1210c) connect to a corresponding database (1208, 1212a-1212c). For example, the corresponding database includes a database stored within the data node 704 of FIG. 7 (e.g., a sensitive token database, an event database, or another suitable database). As discussed above, each server computing device 1210 can correspond to a group of servers, and each of these servers can share a database or can have its own database (and/or interface with external databases, such as third-party databases 108a-108n). In addition to information described concerning the data node 704 of FIG. 7, databases 1208 and 1212 can warehouse (e.g., store) other suitable information, such as sensitive or forbidden tokens, user credential data, authentication data, graphical representations, code samples, system policies or other policies, templates, computing languages, data structures, software application identifiers, visual layouts, computing language identifiers, mathematical formulae (e.g., weighted average, weighted sum, or other mathematical formulas), graphical elements (e.g., colors, shapes, text, images, multimedia), system protection mechanisms (e.g., prompt validation model parameters or criteria), software development or data processing architectures, machine learning models, AI models, training data for AI/machine learning models, historical information, or other information.

Though databases 1208 and 1212 are displayed logically as single units, databases 1208 and 1212 can each be a distributed computing environment encompassing multiple computing devices, can be located within their corresponding server, or can be located at the same or at geographically disparate physical locations.

Network 1204 (e.g., corresponding to the network 150) can be a local area network (LAN) or a wide area network (WAN) but can also be other wired or wireless networks. In some implementations, network 1204 is the Internet or some other public or private network. Client computing devices 1202 are connected to network 1204 through a network interface, such as by wired or wireless communication. While the connections between server computing device 1206 and server computing device 1210 are shown as separate connections, these connections can be any kind of LAN, WAN, wired network, or wireless network, including network 1204 or a separate public or private network.

FIG. 13 shows a diagram of an AI model, according to some implementations to the disclosed technology. AI model 1300 is shown. In some implementations, AI model 1300 can be any AI model. In some implementations, AI model 1300 can be part of, or work in conjunction with, server computing device 1206 (FIG. 12). For example, server computing device 1206 can store a computer program that can use information obtained from AI model 1300, provide information to AI model 1300, or communicate with AI model 1300. In other implementations, AI model 1300 can be stored in database 1208 and can be retrieved by server computing device 1206 to execute/process information related to AI model 1300.

In some implementations, AI model 1300 can be a machine learning model 1302. Machine learning model 1302 can include one or more neural networks or other machine learning models. As an example, neural networks can be based on a large collection of neural units (or artificial neurons). Neural networks can loosely mimic the manner in which a biological brain works (e.g., via large clusters of biological neurons connected by axons). Each neural unit of a neural network can be connected with many other neural units of the neural network. Such connections can be enforcing or inhibitory in their effect on the activation state of connected neural units. In some implementations, each individual neural unit can have a summation function that combines the values of all its inputs together. In some implementations, each connection (or the neural unit itself) can have a threshold function such that the signal must surpass the threshold before it propagates to other neural units. These neural network systems can be self-learning and trained, rather than explicitly programmed, and can perform significantly better in certain areas of problem solving, as compared to traditional computer programs. In some implementations, neural networks can include multiple layers (e.g., where a signal path traverses from front layers to back layers). In some implementations, backpropagation techniques can be utilized by the neural networks, where forward stimulation is used to reset weights on the "front" neural units. In some implementations, stimulation and inhibition for neural networks can be more free-flowing, with connections interacting in a more chaotic and complex fashion.

As an example, with respect to FIG. 13, machine learning model 1302 can take inputs 1304 and provide outputs 1306. In one use case, outputs 1306 can be fed back to machine learning model 1302 as input to train machine learning model 1302 (e.g., alone or in conjunction with user indications of the accuracy of outputs 1306, labels associated with the inputs, or other reference feedback information). In another use case, machine learning model 1302 can update its configurations (e.g., weights, biases, or other parameters) based on its assessment of its prediction (e.g., outputs 1306) and reference feedback information (e.g., user indication of accuracy, reference labels, or other information). In another use case, where machine learning model 1302 is a neural network, connection weights can be adjusted to reconcile differences between the neural network's prediction and the reference feedback. In a further use case, one or more neurons (or nodes) of the neural network can require that their respective errors are sent backward through the neural network to them to facilitate the update process (e.g., backpropagation of error). Updates to the connection weights can, for example, be reflective of the magnitude of error propagated backward after a forward pass has been completed. In this way, for example, the machine learning model 1302 can be trained to generate better predictions.

As an example, where the prediction models include a neural network, the neural network can include one or more input layers, hidden layers, and output layers. The input and output layers can respectively include one or more nodes, and the hidden layers can each include a plurality of nodes. When an overall neural network includes multiple portions trained for different objectives, there may or may not be input layers or output layers between the different portions. The neural network can also include different input layers to receive various input data. Also, in differing examples, data can be input to the input layer in various forms, and in various dimensional forms input to respective nodes of the input layer of the neural network. In the neural network, nodes of layers other than the output layer are connected to nodes of a subsequent layer through links for transmitting output signals or information from the current layer to the subsequent layer, for example. The number of the links can correspond to the number of the nodes included in the subsequent layer. For example, in adjacent fully connected layers, each node of a current layer can have a respective link to each node of the subsequent layer, noting that in some examples such full connections can later be pruned or minimized during training or optimization. In a recurrent structure, a node of a layer can be again input to the same node or layer at a subsequent time, while in a bi-directional structure, forward and backward connections can be provided. The links are also referred to as connections or connection weights, referring to the hardware-implemented connections or the corresponding "connection weights" provided by those connections of the neural network. During training and implementation, such connections and connection weights can be selectively implemented, removed, and varied to generate or obtain a resultant neural network that is thereby trained and that can be correspondingly implemented for the trained objective, such as for any of the above example recognition objectives.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples of the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples: alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology not only can include additional elements to those implementations noted above, but also can include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system can vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, either in this application or in a continuing application.

We claim:

1. One or more non-transitory, computer-readable storage medium comprising instructions recorded thereon, wherein the instructions, when executed by at least one data processor of a system, cause the system to:

receive, from a user, a query comprising a request relating to a particular domain;

determine, based on the query, a set of sub-queries using a decomposition model trained to determine sub-queries based on one or more of semantic boundaries, syntactics, tasks, relationships, and rules relating to particular domains;

input the set of sub-queries into a routing model to determine a set of specialized models for the set of sub-queries, wherein the routing model is trained to assign sub-queries for input into a set of specialized models according to one or more routing strategies that balance or prioritize a plurality of factors;

for each particular sub-query in the set of sub-queries:
route the particular sub-query to a respective specialized model in the set of specialized models;
input the particular sub-query into the respective specialized model to generate an output; and
assign, to each respective output, a confidence score based on a reliability of the respective specialized model, a complexity of the particular sub-query, and a relevance of the respective output;

detect a conflict among a set of outputs generated for the set of sub-queries, wherein the conflict is detected using a conflict detection model configured to identify logical, factual, or semantic discrepancies among outputs, and wherein the conflict comprises a discrepancy between two outputs of the set of outputs;

cause the routing model to update, based on the conflict, to minimize future conflicts among sets of outputs generated by the routing model;

generate an aggregated output by combining the set of outputs according to (i) a weighted aggregation algorithm that prioritizes outputs with higher confidence scores and (ii) a plurality of conflict resolution rules, wherein the aggregated output resolves the conflict between the two outputs; and

cause display of the aggregated output in response to the query.

2. The one or more non-transitory, computer-readable storage medium of claim 1, wherein the instructions further cause the system to:

extract, from the query, context relating to both the user and a query session involving the user, the context including historical interaction data and relevant system parameters, wherein the plurality of conflict resolution rules are based on the context relating to both the user and the query session involving the user.

3. The one or more non-transitory, computer-readable storage medium of claim 1, wherein the one or more routing strategies comprise one or more of a performance-based routing strategy that prioritizes latency requirements and accuracy thresholds, a cost-optimized routing strategy that balances computational costs with quality requirements, a domain expertise routing strategy that prioritizes expertise of the set of specialized models, and a learning-based routing strategy that updates based on historical performance and real-time feedback.

4. The one or more non-transitory, computer-readable storage medium of claim 1, wherein the instructions further cause the system, prior to inputting the set of sub-queries into the routing model, to:

utilize a load balancer, the load balancer being configured to distribute the set of sub-queries across multiple instances of the set of specialized models and manage allocation of system resources to the multiple instances of the set of specialized models, wherein the load balancer is further configured to prevent resource bottlenecks by directing each sub-query of the set of sub-queries to a selected instance of the set of specialized models based at least in part on a real-time system load and an availability of computational resources.

5. The one or more non-transitory, computer-readable storage medium of claim 1, wherein the instructions for determining the set of sub-queries further cause the system to:

identify at least one of:
semantic boundaries or conceptual units within the request;
syntactics within the request, the syntactics comprising clauses, modifiers, or logical operators;
tasks indicated by the request;
entities and relationships between the entities from the request; and
rules specific to components of the request; and determine the set of sub-queries based on the at least one of the semantic boundaries, the syntactics, the tasks, the entities and the relationships, and the rules.

6. A method comprising:

receiving, from a user, a query comprising a request relating to a particular domain;

determining, based on the query, a set of sub-queries using a decomposition model trained to determine sub-queries;

inputting the set of sub-queries into a routing model to determine a set of specialized models for the set of sub-queries, wherein the routing model is trained to assign sub-queries for input into a set of specialized models according to one or more routing strategies;

for each particular sub-query in the set of sub-queries:
routing the particular sub-query to a respective specialized model in the set of specialized models;

inputting the particular sub-query into the respective specialized model to generate an output;

assigning, to each respective output, a confidence score; and classifying one or more intents associated with the query by using a trained intent classification model to detect both a primary intent and at least one secondary intent within the query, wherein the trained intent classification model assigns a confidence score to each detected intent, and generating an aggregated output by combining the set of outputs according to (i) a weighted aggregation algorithm that prioritizes outputs with higher confidence scores and (ii) a plurality of conflict resolution rules, wherein the aggregated output is based at least in part on the one or more intents; and causing display of the aggregated output in response to the query.

7. The method of claim 6, further comprising:

extracting, from the query, context relating to both the user and a query session involving the user, the context including historical interaction data and relevant system parameters, wherein the plurality of conflict resolution rules are based on the context relating to both the user and the query session involving the user.

8. The method of claim 6, wherein the one or more routing strategies comprise one or more of a performance-based routing strategy that prioritizes latency requirements and accuracy thresholds, a cost-optimized routing strategy that balances computational costs with quality requirements, a domain expertise routing strategy that prioritizes expertise of the set of specialized models, and a learning-based routing strategy that updates based on historical performance and real-time feedback.

9. The method of claim 6, further comprising, prior to inputting the set of sub-queries into the routing model:

utilizing a load balancer, the load balancer being configured to distribute the set of sub-queries across multiple instances of the set of specialized models and manage allocation of system resources to the multiple instances of the set of specialized models, wherein the load balancer is further configured to prevent resource bottlenecks by directing each sub-query of the set of sub-queries to a selected instance of the set of specialized models based at least in part on a real-time system load and an availability of computational resources.

10. The method of claim 6, wherein determining the set of sub-queries further comprises:

identifying at least one of:

semantic boundaries or conceptual units within the request;

syntactics within the request, the syntactics comprising clauses, modifiers, or logical operators;

tasks indicated by the request;

entities and relationships between the entities from the request; and rules specific to components of the request; and determining the set of sub-queries based on the at least one of the semantic boundaries, the syntactics, the tasks, the entities and the relationships, and the rules.

11. The method of claim 6, further comprising:

detecting a conflict among a set of outputs generated for the set of sub-queries, wherein the conflict is detected using a conflict detection model configured to identify logical, factual, or semantic discrepancies among outputs, and wherein the conflict comprises a discrepancy between two outputs of the set of outputs, wherein the aggregated output resolves the conflict between the two outputs; and causing the routing model to update, based on the conflict, to minimize future conflicts among sets of outputs generated by the routing model.

12. A system comprising:

a storage device; and one or more processors communicatively coupled to the storage device storing instructions thereon, that cause the one or more processors to:

receive, from a user, a query comprising a request relating to a particular domain;

determine, based on the query, a set of sub-queries using a decomposition model trained to determine sub-queries;

utilize a load balancer, the load balancer being configured to distribute the set of sub-queries across multiple instances of the set of specialized models and manage allocation of system resources to the multiple instances of the set of specialized models, wherein the load balancer is further configured to prevent resource bottlenecks by directing each sub-query of the set of sub-queries to a selected instance of the set of specialized models based at least in part on a real-time system load and an availability of computational resources;

input the set of sub-queries into a routing model to determine a set of specialized models for the set of sub-queries, wherein the routing model is trained to assign sub-queries for input into a set of specialized models according to one or more routing strategies;

for each particular sub-query in the set of sub-queries:

route the particular sub-query to a respective specialized model in the set of specialized models;

input the particular sub-query into the respective specialized model to generate an output; and assign, to each respective output, a confidence score;

generate an aggregated output by combining the set of outputs according to (i) a weighted aggregation algorithm that prioritizes outputs with higher confidence scores and (ii) a plurality of conflict resolution rules; and cause display of the aggregated output in response to the query.

13. The system of claim 12, wherein the instructions further cause the one or more processors to:

extract, from the query, context relating to both the user and a query session involving the user, the context including historical interaction data and relevant system parameters, wherein the plurality of conflict resolution rules are based on the context relating to both the user and the query session involving the user.

14. The system of claim 12, wherein the one or more routing strategies comprise one or more of a performance-based routing strategy that prioritizes latency requirements and accuracy thresholds, a cost-optimized routing strategy that balances computational costs with quality requirements, a domain expertise routing strategy that prioritizes expertise of the set of specialized models, and a learning-based routing strategy that updates based on historical performance and real-time feedback.

15. The system of claim 12, wherein the instructions for determining the set of sub-queries further cause the one or more processors to:

identify at least one of:

semantic boundaries or conceptual units within the request;

syntactics within the request, the syntactics comprising clauses, modifiers, or logical operators;

tasks indicated by the request;

entities and relationships between the entities from the request; and rules specific to components of the request; and determine the set of sub-queries based on the at least one of the semantic boundaries, the syntactics, the tasks, the entities and the relationships, and the rules.

16. The system of claim 12, wherein the instructions further cause the one or more processors to:

classify one or more intents associated with the query by using a trained intent classification model to detect both a primary intent and at least one secondary intent within the query, wherein the trained intent classification model assigns a confidence score to each detected intent, and wherein the aggregated output is based at least in part on the one or more intents.

17. The system of claim 12, wherein the instructions further cause the one or more processors to:

detect a conflict among a set of outputs generated for the set of sub-queries, wherein the conflict is detected using a conflict detection model configured to identify logical, factual, or semantic discrepancies among outputs, and wherein the conflict comprises a discrepancy between two outputs of the set of outputs, wherein the aggregated output resolves the conflict between the two outputs; and cause the routing model to update, based on the conflict, to minimize future conflicts among sets of outputs generated by the routing model.

\* \* \* \* \*